United States Patent
Smith et al.

(10) Patent No.: US 6,463,462 B1
(45) Date of Patent: Oct. 8, 2002

(54) AUTOMATED SYSTEM AND METHOD FOR DELIVERY OF MESSAGES AND PROCESSING OF MESSAGE RESPONSES

(75) Inventors: Charles M. Smith, Franklin; Harold D. St. Clair, Nashville, both of TN (US)

(73) Assignee: Dialogic Communications Corporation, Franklin, TN (US)

(*) Notice: Subject to any disclaimer, the term of this patent is extended or adjusted under 35 U.S.C. 154(b) by 0 days.

(21) Appl. No.: 09/241,807

(22) Filed: Feb. 2, 1999

(51) Int. Cl.[7] ............................................. G06F 15/163
(52) U.S. Cl. ...................................... 709/206; 709/218
(58) Field of Search ........................... 379/88.13, 88.17; 709/203, 205, 206, 218

(56) References Cited

U.S. PATENT DOCUMENTS

| | | | |
|---|---|---|---|
| 4,340,973 A | 7/1982 | Umetsu | 455/228 |
| 4,371,751 A | 2/1983 | Hilligoss, Jr. et al. | 379/41 |
| 4,392,248 A | 7/1983 | Eckels et al. | 455/161.3 |
| 4,551,855 A | 11/1985 | Kurosaki et al. | 455/161.1 |
| 4,633,515 A | 12/1986 | Uber et al. | 455/161.3 |
| 4,791,658 A | 12/1988 | Simon et al. | 379/41 |
| 4,922,514 A | 5/1990 | Bergeron et al. | 379/29.01 |
| 5,268,928 A | 12/1993 | Herh et al. | 375/222 |
| 5,327,478 A | 7/1994 | Lebowitz | 379/40 |
| 5,454,024 A | 9/1995 | Lebowitz | 379/40 |
| 5,633,916 A * | 5/1997 | Goldhagen et al. | 379/88.17 |
| 5,737,395 A * | 4/1998 | Irribarren | 379/88.13 |
| 5,794,039 A * | 8/1998 | Guck | 707/103 |
| 6,031,895 A * | 2/2000 | Cohn et al. | 379/88.13 |

* cited by examiner

Primary Examiner—N. Le
Assistant Examiner—Walter Benson
(74) Attorney, Agent, or Firm—Waddey & Patterson, P.C.; Mark J. Patterson

(57) ABSTRACT

An automated system for delivery of messages to multiple recipients, and for processing of responses to the messages, includes a message client, message server, and system database. A message is created using a universal message form. The message content can be translated into multiple formats and sent to one or more different recipients using one or more different types of messaging devices, including pagers, telephones, fax machines, and e-mail readers. A recipient profile manager allows each recipient to select the messaging devices to be used for message delivery as well as preferred messaging schedules, priorities, and message security. Receipt of the messages by the recipients is verified, response requirements collected and consolidated from multiple sources and presented to the message originator in a structured format.

23 Claims, 22 Drawing Sheets

| | A | B | C | D | E | F | G | H |
|---|---|---|---|---|---|---|---|---|
| 1 | ID | Name | Date | Time | Status | Credit Card | Expiration | Frequen |
| 2 | 3679834 | Jim Lennox | 1/7/99 | 3:58 PM | Confirmed | 7382 23945 32 | 0701 | 736 545 |
| 3 | 2569378 | Robert Donovan | 1/7/99 | 3:59 PM | Confirmed | 7382 34572 87 | 0500 | 938 382 |
| 4 | 8573943 | Sandy Olson | 1/8/99 | 12:52 PM | Sent | | | |
| 5 | 9057343 | Glenn Murphy | 1/8/99 | 12:53 PM | Sent | | | |
| 6 | 8956903 | David Rucker | 1/8/99 | 12:54 PM | Confirmed | 7382 73456 98 | 0499 | 238 392 |
| 7 | 7837423 | Tom Alexander | 1/8/99 | 12:54 PM | Sent | | | |
| 8 | 2348923 | Michael Kirkpatrick | 1/8/99 | 1:41 PM | Sent | | | |
| 9 | 2238942 | Dan Atwood | 1/8/99 | 1:51 PM | Confirmed | 7382 78564 12 | 0801 | 392 843 |

AUTOMATED SYSTEM AND METHOD FOR DELIVERY OF MESSAGES AND PROCESSING OF MESSAGE RESPONSES

BACKGROUND OF THE INVENTION

The present invention relates generally to the creation and delivery of messages, and the routing, verification and collection of responses to the messages, using systems and methods that are universally applicable to, and independent of, the type of messaging system and device selected by the message recipients. More particularly, the present invention relates to automating and escalating delivery of messages and collection of message responses, implemented through multiple messaging devices in conjunction with recipient profiles, verification of notifications and responses, and collection of responses in a predefined format.

Businesses and their employees are actively involved in sending and receiving information using a variety of messaging formats, systems, and message receiving devices. For example, a traveling employee might, in a single trip away from the office, receive messages sent by fax, pager, electronic mail (e-mail), and voice mail. In addition, the messaging devices by which these messages are actually received might include a pager, a cellular telephone, a paper fax machine, a voice mailbox, or a portable computer connected to the Internet or to a private local area network (LAN). Often these messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

Commercially available e-mail systems provide users with a method of creating and delivering digital messages to other e-mail addresses. Attachments of files may also be included with the e-mail message for recipient review. The address selections are sender defined and require entry and updating by the party responsible for initiating the message. Recipients may respond back to the sender's e-mail address, at which point the sender has confirmation that their message was acted upon.

Commercially available unified messaging systems generally replace older communications technology with integrated voice and messaging systems for receipt of communications. Receipt of voice messages in a unified messaging system includes wave file recordings that are accessed by the recipient from an e-mail format.

Other media specific device systems address e-mail to pager, pager to e-mail, e-mail to fax, and e-mail to voice, but do this separately. In a typical conventional system of this type, e-mail messages are created, addressed to specific devices, and sent to those devices using the device-specific translation programs required. Commercially available servers route messages to recipients chosen by the sender for specific types of messaging devices through public-switched telephone networks (PSTN), over the Internet, and at non-peak periods through PSTN using least cost routing methods.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, the e-mail, unified messaging and specific device systems using these prior art methods are deficient in responding to these requirements.

What is needed, then, is a system and method for automating and escalating the delivery of messages and collection of message responses, implemented through messaging devices of multiple types, in conjunction with recipient rules routing, verification of notification and response, and collection of responses in a predefined format.

SUMMARY OF THE INVENTION

One object of the present invention is to create messages using a universal format that is independent of the type of messaging devices used for delivering the messages, with attachments and response requirements, to multiple e-mail, voicemail, fax, pager and telephone communications devices. The communications can be initiated by a sender, or automatically created as a digital message based on escalating trigger events.

Another object of the present invention is to provide a message processing system and method that defines and is adapted for use with multiple types of messaging devices and that delivers messages and notifications based on time of receipt, priority of information delivered, and security of the communications device.

Yet another object of the invention is to allow the use of recipient rules routing profiles that are maintained by each recipient on the system and can be modified by them at any time.

A further object of the present invention is to verify message responses from the recipients, collect and consolidate response requirements from multiple messaging sources, and present the information to the message originator in a structured format.

These and other objects are achieved in an automated system and method for delivery of messages and processing of message responses through the automation of; (1) processing messages and associated information for simultaneous delivery to existing multiple type of messaging devices, 2) routing messages and associated information based on recipient profile rules for receiving the message, and (3) response, verification, collection and consolidation of response requirements.

BRIEF DESCRIPTION OF THE DRAWINGS

FIG. 19 is a graphic display of a group of organized responses to the sample message shown in FIG. 13, viewed as a spreadsheet using the Response Viewer module, as implemented in the system of FIG. 9.

DETAILED DESCRIPTION OF THE PREFERRED EMBODIMENTS

System Overview

Figure 1:
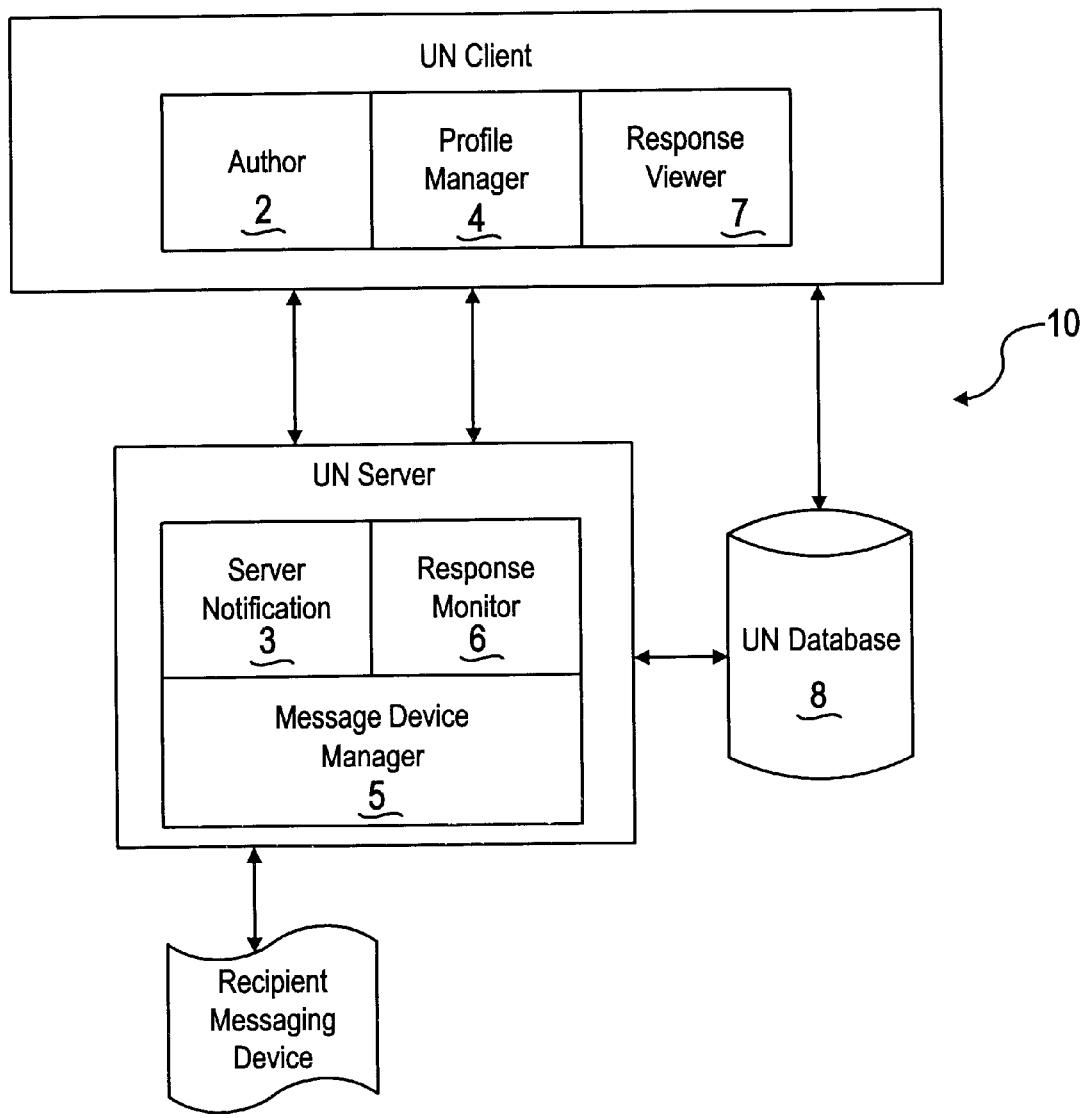
FIG. 1 is a block diagram representation of one embodiment of the universal notification ("UN") system of the present invention depicting flow of message and communications information between and among the UN Client, UN Server, UN Database, and Recipient Messaging Devices.

Looking at FIG. 1, the universal notification and messaging ("UN") system 10 of the present invention generally includes a UN Client, UN Server, and UN Database 8, each operatively linked to each other and to one or more recipient messaging devices. Preferably, the UN Client combines a conventional computer system with three software modules: a Message Author module 2 for initiating messages to recipients; a Profile Manager 4 for managing recipient profiles; and a Response Viewer 7 for viewing responses received from message recipients.

The UN Server also combines a conventional computer system with software modules that include a Server Notification module 3 for processing and routing messages to recipients; a Messaging Device Manager 5 for managing the communications links to one or more types of messaging devices, and a Response Monitor 6 that monitors responses received back from message recipients.

The UN Database 8 can be a conventional mass storage device combined with or linked to a processor and database engine for maintaining required recipient tables, system settings and response fields.

Generally, the flow of device independent messages is initiated in digital format, either manually by Message Author 2 or triggered automatically by some external event. Recipients are selected, message and response fields entered, and attachments are selected at this point. The Profile Manager 4 provides the recipient with tools to define their preferred method, time, priority and security of message delivery, and stores this information in a client profile in UN Database 8. The Server Notification module 3 creates required system folders for processing and interaction with Messaging Device Manager 5 and Response Monitor 6. The Messaging Device Manager 5 converts the message information received from the UN Client into the proper format for receipt and response by a recipient. The format used by the Messaging Device Manager 5 corresponds to the messaging device(s) selected by the recipients and stored in their respective client profiles. These messaging devices and communications formats will include e-mail, voicemail, fax, pager, telephone and wireless messaging devices. The same information can be simultaneously delivered to recipients over the Internet and via PSTN through various third-party telecommunications gateways.

After the recipients have received the messages and initiated a response, the response data is returned through the Server Notification module 3 and transmitted to the Response Monitor 6. From the Response Monitor 6, the response data is routed to the proper system folders for collection and storage in UN Database 8.

The Response Viewer module 7 has access to all returned message information, and provides verification of message delivery or notifications, status of responses, and consolidation of recipient response data.

Accordingly, the UN system 10 improves business productivity by extending messaging to all forms of business communications, providing effective notification, immediate verification of message receipt, and proactive closure. The system 10 delivers messages through any conventional messaging device from an initial e-mail interface using recipient defined contact rules, and provides responses quickly back to the message sender in a controlled and defined format. Thus, the system 10 closes the loop on messaging communications.

Message Author Module

Figure 2:
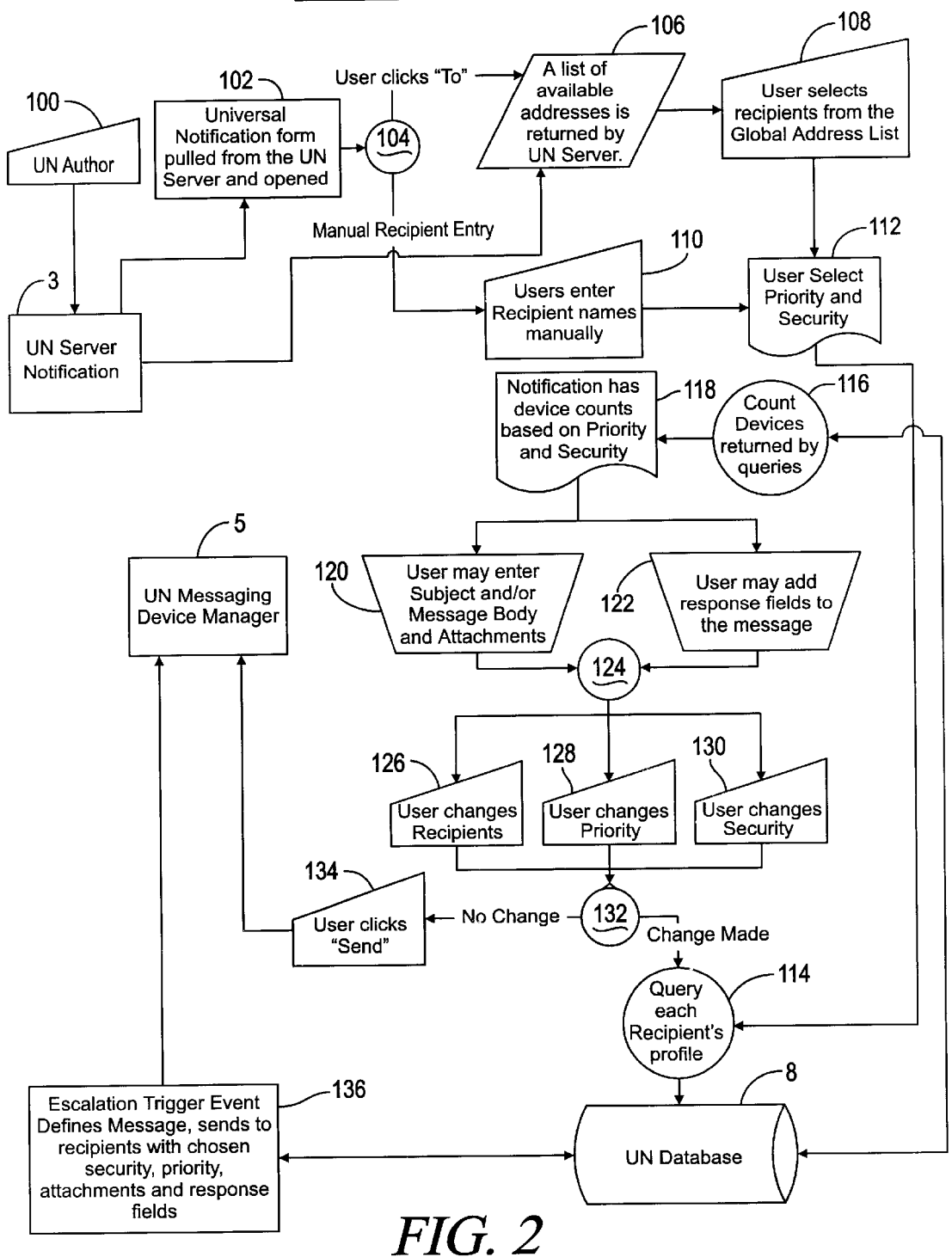
FIG. 2 is a flow chart illustrating the functionality of the software routines implemented in the Message Author module, for the initiation of manual and triggered messages according to the system of present invention.

FIG. 2 is a flow chart describing the functioning of the Message Author module 2 software routines used in the initiation of manual and triggered messages according to the present invention. Block 100 is the starting point where the user selects "new notification" to begin the messaging process with a blank UN universal message form at block 102 opened in the UN Server Notification module 3. The user proceeds to block 104 to start entry of other message information selecting from a list of recipients 106, 108 on a global address list opened in the UN Server Notification module 3, or entered manually 110. The user then selects message priority and security 112, at which point system queries 114 the UN Database 8 for recipient profiles. Based on the choice of recipients, priority and security 116, the user is informed of the number and type of messaging devices that will be notified 118. The user may then enter subject, message body and attachments 120, as well as add response fields to the message 122. Response fields are structured information formats that link to the message through the UN Database 8 and UN Server Notification and Response Monitor modules 3 and 6. Automatic selection of previously used response fields and creation of new ones are accomplished at block 122. Proceeding to block 124, the user may change recipients 126, priority 128, and security 130 before arriving at block 132, where the choice is made to query 114 the UN Database 8 again for recipient profile changes or send 134 the completed UN message form to the Messaging Device Manager 5. Escalating trigger events 136 received from external messaging devices deliver message forms directly to the Messaging Device Manager 5, with recipients, priority, security, message body, attachments and response fields automatically processed from the UN Database 8.

UN Server Notification Module

Figure 3:
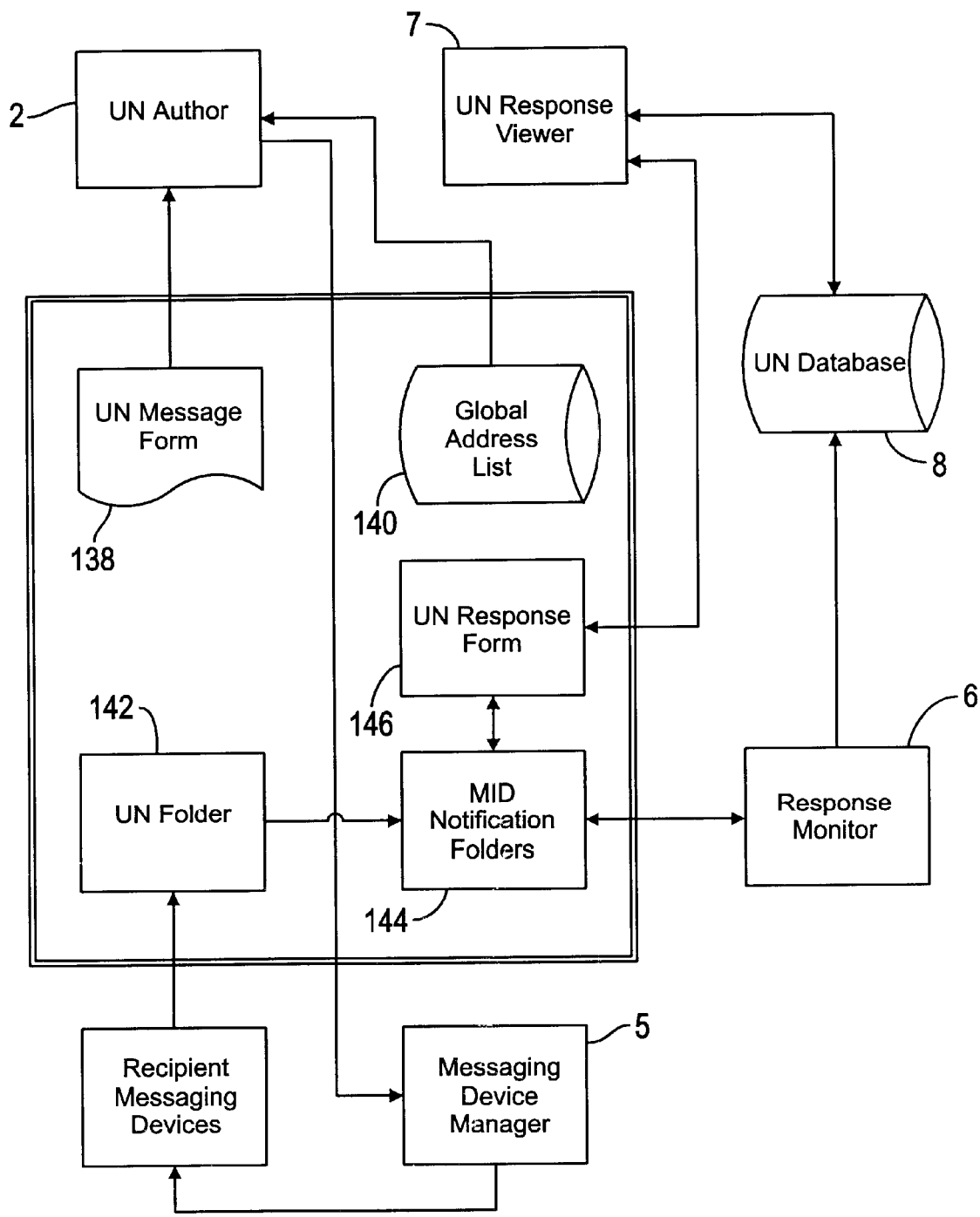
FIG. 3 is a block diagram overview of the flow of information in the UN Server Notification module for processing and routing messages from the Message Author module to the recipients, according to the system of the present invention.

FIG. 3 presents an overview of the flow of information in the UN Server Notification module 3 from the Message Author 2 and UN Database 8 for processing and routing to Messaging Device Manager and Response Monitor modules 5 and 6 according to the present invention. A new UN message form 138 is created when the Message Author 2 requests "new notification", and the global address list 140 is opened for recipient selections. Upon completion of the process illustrated in FIG. 2, messages are sent to the Messaging Device Manager 5. This is where all outgoing communications are addressed for proper recipient messaging device communications. Incoming responses from recipient messaging devices are received in the UN Folder 142, and MID notification folders 144 are created for server access to specific responses that include a unique embedded message identification for access by the Response Monitor 6. A new UN response form 146 is created when the Response Viewer 7 requests "open message response", and the user has access to all returned communications information, including verification of notifications, status of responses, and consolidation of recipient response information in the UN Database 8.

Profile Manager Module

Figure 4:
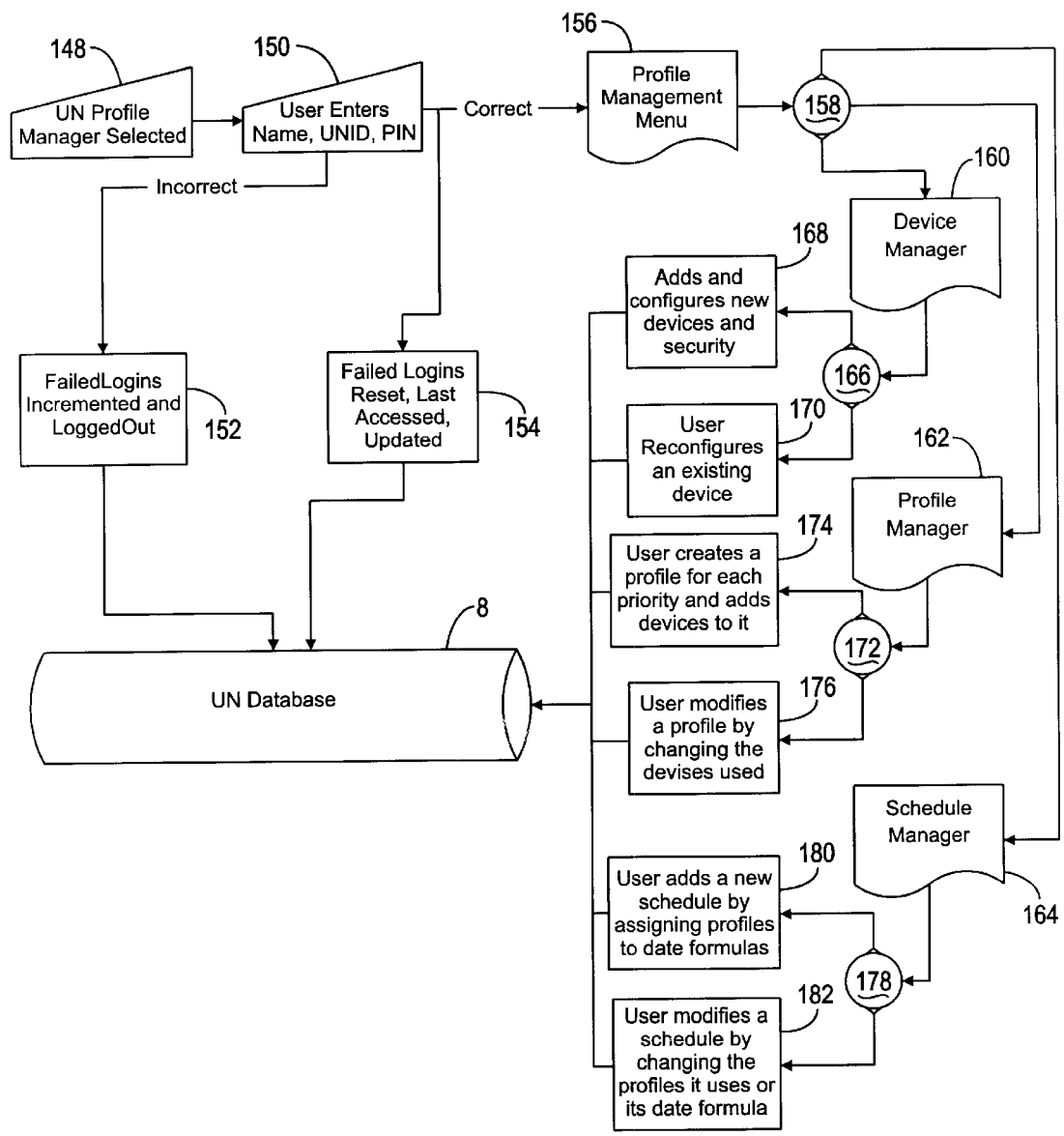
FIG. 4 is a flow chart of the software routines implemented in the Profile Manager module for developing and maintaining recipient profiles according to the present invention.

FIG. 4 is a flowchart showing the basic functionality of the Profile Manager 4 routines used for developing and maintaining recipient profiles according to the present invention. The user defines message delivery methods according to the message priority, device security and time schedule. Block 148 is the starting point where the user selects "profile manager" to begin the Profile Manager 4 process. The user enters name, UN identification and PIN 150, where checking 152 against UN Database 8 occurs and access 154 is granted. A profile management menu 156 is then presented to the user for selection 158 of device manager 160, profile manager 162 or schedule manager 164. Upon selection of device manager 160, the user chooses 166 to add and configure new devices 168 for receipt of messaging information sent by the system 10. These include multiple e-mail, voicemail, fax, pager, telephone and wireless communication devices. The user also selects which devices are secure for sensitive or confidential information receipt. Changes to existing devices 170 can also be made for reconfiguration requirements, and all current device parameters are stored in the UN Database 8. Upon selection of profile manager 162, the user chooses 172 to create a profile 174 for each priority and adds communications devices previously selected. The profile designates locations such as work, home, vacation, travel office, travel accommodations and other user preferences. Priority levels are selected based on the importance of communications information to be received. Changes to existing profiles 176 can also be made, and all current profiles are stored in the UN Database 8.

Upon selection of schedule manager 164, the user chooses 178 to add a new schedule 180 by assigning profiles previously created to date formulas. The schedule designates time frames and dates such as weekday, weekend, vacation, holiday and user preferences. Changes to the existing schedule 182 can also be made, and all schedule information is stored in the UN Database 8 along with profiles and devices for access by the Message Author 2 as described above with reference to FIG. 2.

Messaging Device Manager

Figure 5:
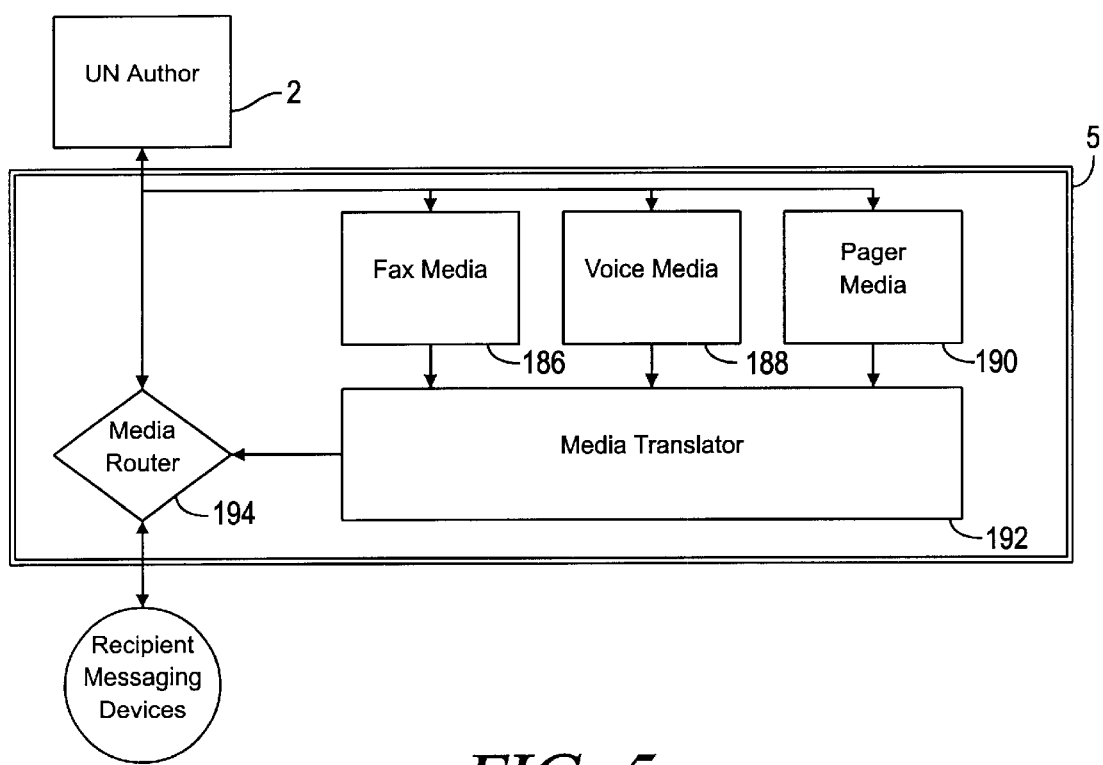
FIG. 5 is a block diagram overview of the flow of information through the Messaging Device Manager module used to convert the message into the proper communications format for receipt and response by recipient messaging devices.

FIG. 5 presents an overview of the flow of information through the Messaging Device Manager 5 used to convert messages into the proper communications format for receipt and response by the recipients messaging devices according to the present invention. Messages from Message Author 2 flow into the Messaging Device Manager 5 where they are sorted into media folders for fax 186, voice 188 and pager 190 formatting. The media folders process the appropriate communications through the media translator 192, creating new message formats and addresses based on the recipient information received and messaging devices to which the messages are destined. The Messaging Device Manager 5 then sends the new messages out to the recipients messaging devices through the media router 194 which delivers translated information simultaneously over the Internet and PSTN through various conventional third-party telecommunication gateways. E-mail messages are sent directly to recipient e-mail devices through the Internet. Recipient responses are received and processed by the UN Server Notification module as shown in FIG. 3.

Response Monitor Module

Figure 6:
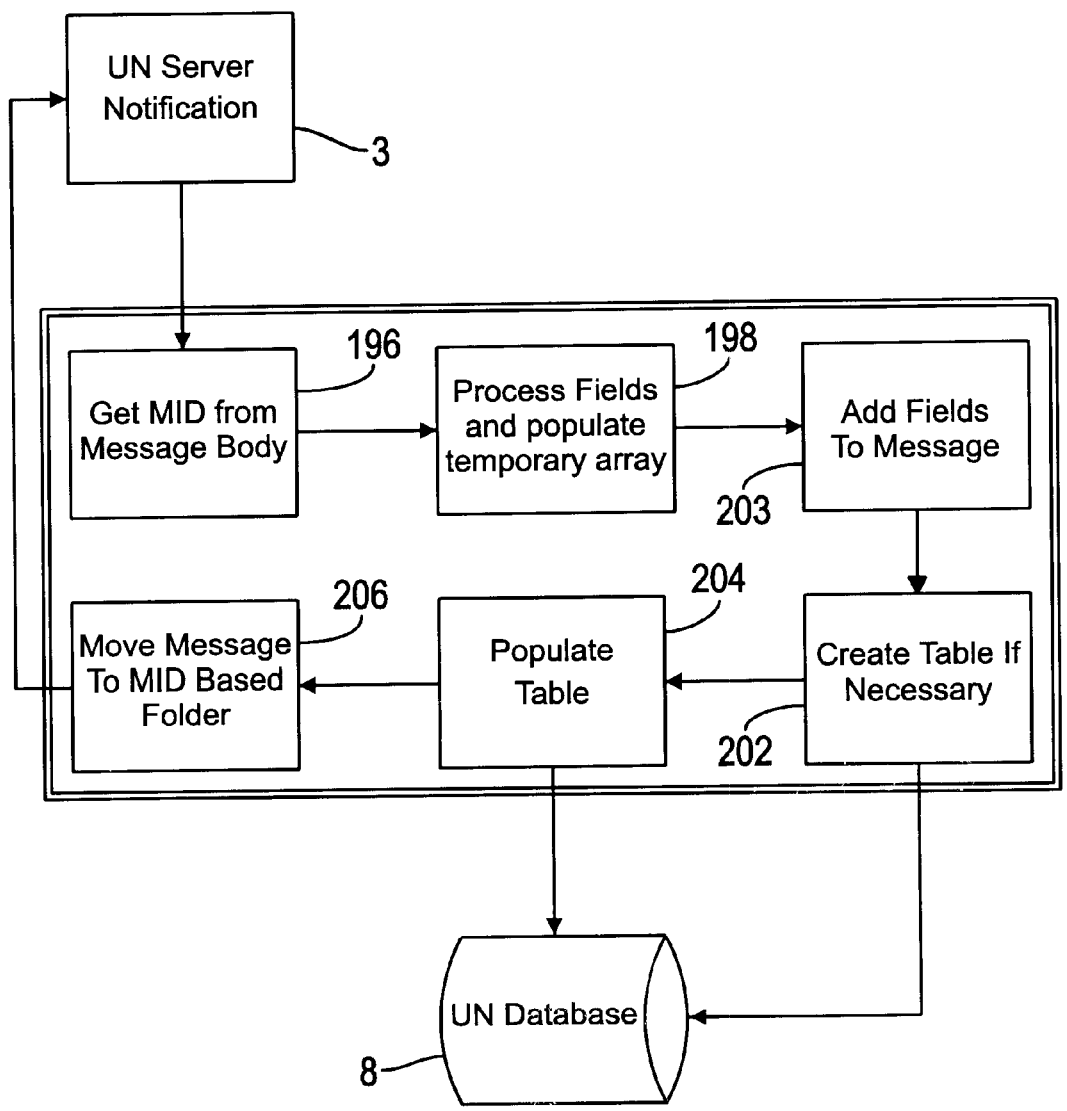
FIG. 6 is a block diagram overview of the flow of message information in the Response Monitor module for processing and routing responses from recipient messaging devices to the UN Database and Response Viewer.

FIG. 6 depicts an overview of the flow of information in the Response Monitor 6 for processing and routing responses from the Server Notification module 3 to the UN Database 8 and Response Viewer 7 according to the present invention. The Response Monitor 6 at block 196 continually polls MID Notification folders 144 from the UN Server Notification module 3 for recipient responses. The message bodies are retrieved, and fields are processed 198 to create temporary arrays. These fields are added to the message body 200, and at the same time a table is created 202 in the UN Database 8 and populated 204 with the MID Notification specific data. The message is then restored 206 to the MID Notification Folder 144 in the Server Notification module 3 for access by the Response Viewer 7.

Response Viewer Module

Figure 7:
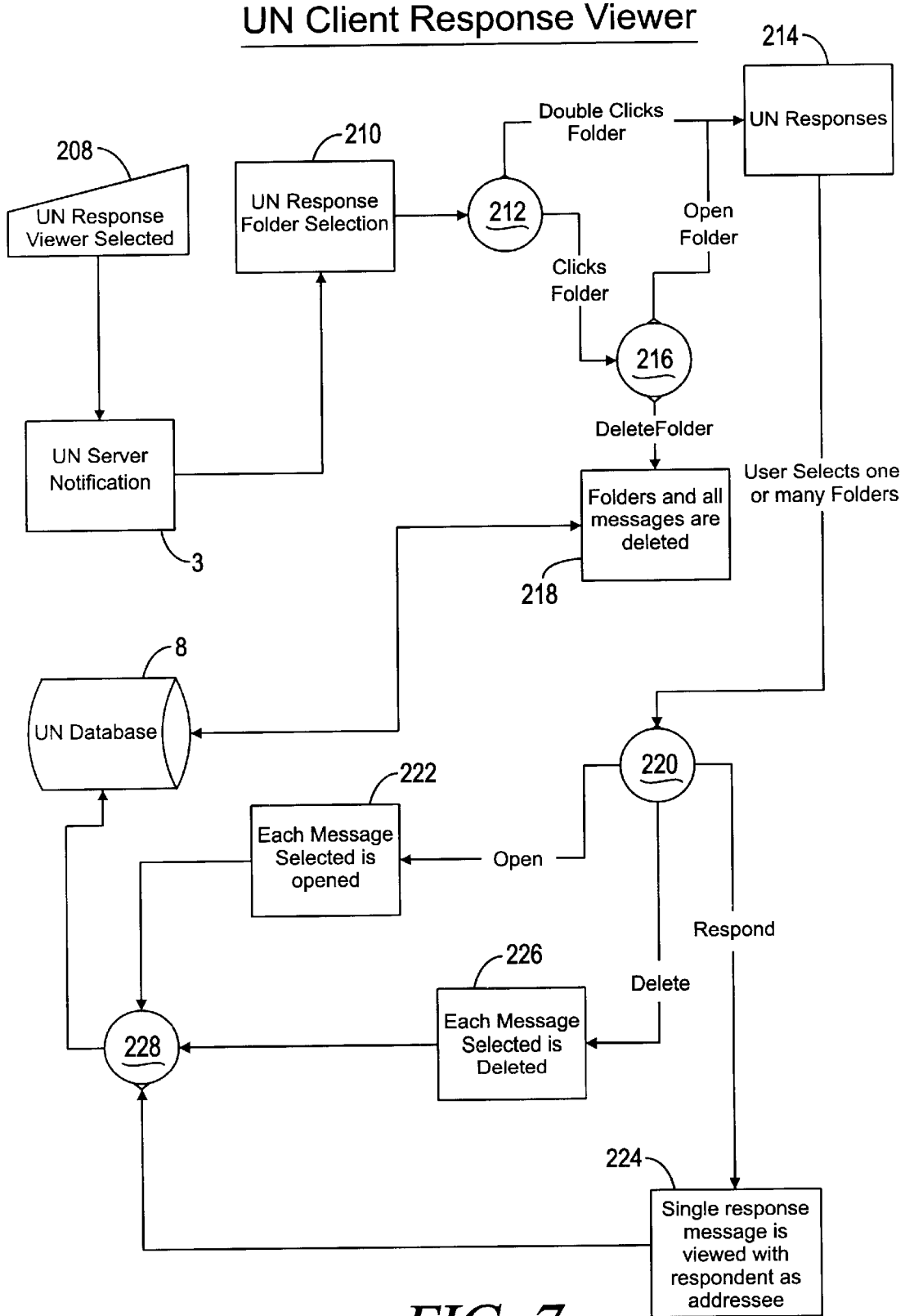
FIG. 7 is a flow chart of the software routines implemented in the Response Viewer module for viewing of message information and collection of response information.

FIG. 7 is a flow chart depicting the steps implemented in the Response Viewer 7 for viewing of message responses and collection of information according to the present invention. The user has access to all returned message information, verification of messages, status of responses and consolidation of recipient response information. Block 208 is the starting point where "Response Viewer" is selected and the user is presented with a view of all MID Notification folders 210 available to them through the UN Response Form 146 from Server Notification module 3 (see FIG. 3). Only those MID Folders that were initiated as the result of a message by the user are available. The user can then open or delete specific folders 216, or go directly to selected folders 212 for viewing all responses within the selected folder. When deleting folders 218 all messages are removed as well. Upon selection of one or many messages 220, each message is either opened 222, deleted 226 or a single response message 224 is opened with each selected sender as an addressee. The user then has access to all returned communication information, verification of message delivery and status of responses. Consolidation of recipient response information from the UN Database 8 is also provided to the user. Upon completion of Response Viewer 7 usage, the user closes the message folder 228.

UN Database

Figure 8:
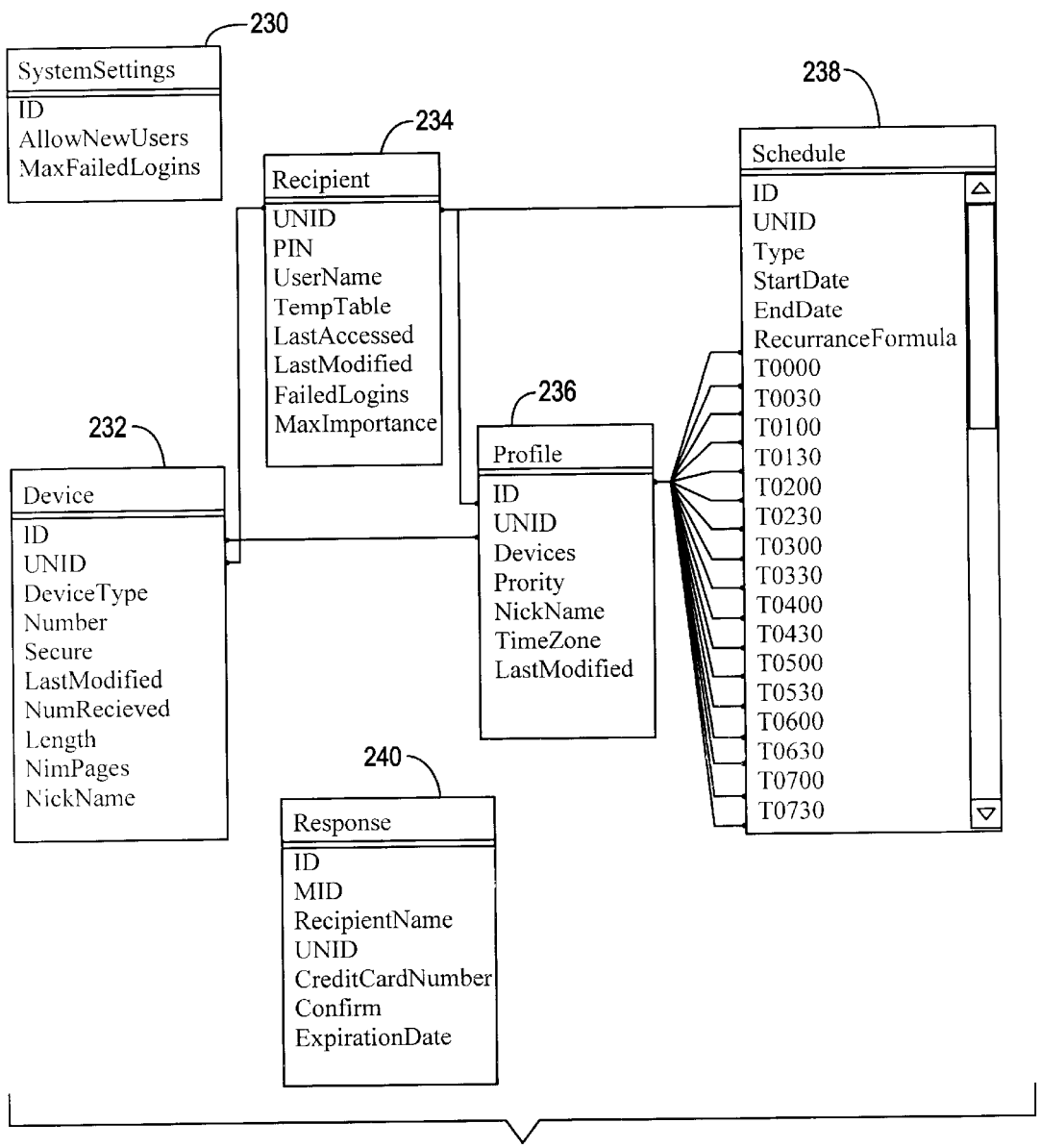
FIG. 8 illustrates the organization of data dictionary tables and data fields in the UN Database used for processing messages and storing recipient profile and response field data.

FIG. 8 illustrates an example of the six major data dictionary tables contained in the UN Database 8 for processing messages and storing profile and response field data according to the present invention. UN system identification 230 provides information for user log in and access along with unique user identification and PIN 234. Profile management information for the media device manager 232, recipient profile manager 236, and schedule manager 238 are contained in the data dictionary tables for access by the Message Author 2 and modification by the Profile Manager 4. The Response Monitor 6 and Response Viewer 7 also contain response field data dictionary tables 240 in the UN Database 8 for processing notifications.

An example of how the system 10 can interact with an outside system or device (not shown) to automatically trigger a message based on an external event is as follows: An external mainframe computer constructs a pre-formatted e-mail "trigger" message specifying the recipients, message priority, response fields, and sensitivity. An external event causes the mainframe computer to send this trigger message to a trigger message e-mail address on the UN Server. Upon receipt, the trigger message is re-formatted by the Author module 2 as a universal message and processed accordingly as described above. A message is automatically returned to the external triggering system specifying the notification or message ID. As the message progresses through the system 10 and to the various recipients, the triggering system can retrieve responses directly from the UN Database 8 by opening the response data table generated by the Response Monitor 6 and UN Database 8, corresponding to the Message ID.

System Implementation

The system 10 of this invention can be implemented in a variety of messaging environments and computing platforms. For example, the system 10 can be adapted to provide a high degree of integrated functionality in a computing platform that uses Microsoft Windows 98 or Windows 2000 as its operating system, Microsoft Outlook 2000 as a user messaging client and interface, and Microsoft Exchange Server as a messaging server controlling the flow of messages to and from the Outlook client workstations. In such an embodiment, the UN Client would be accessed as a toolbar extension in the Microsoft Office 2000 environment.

Figure 9:
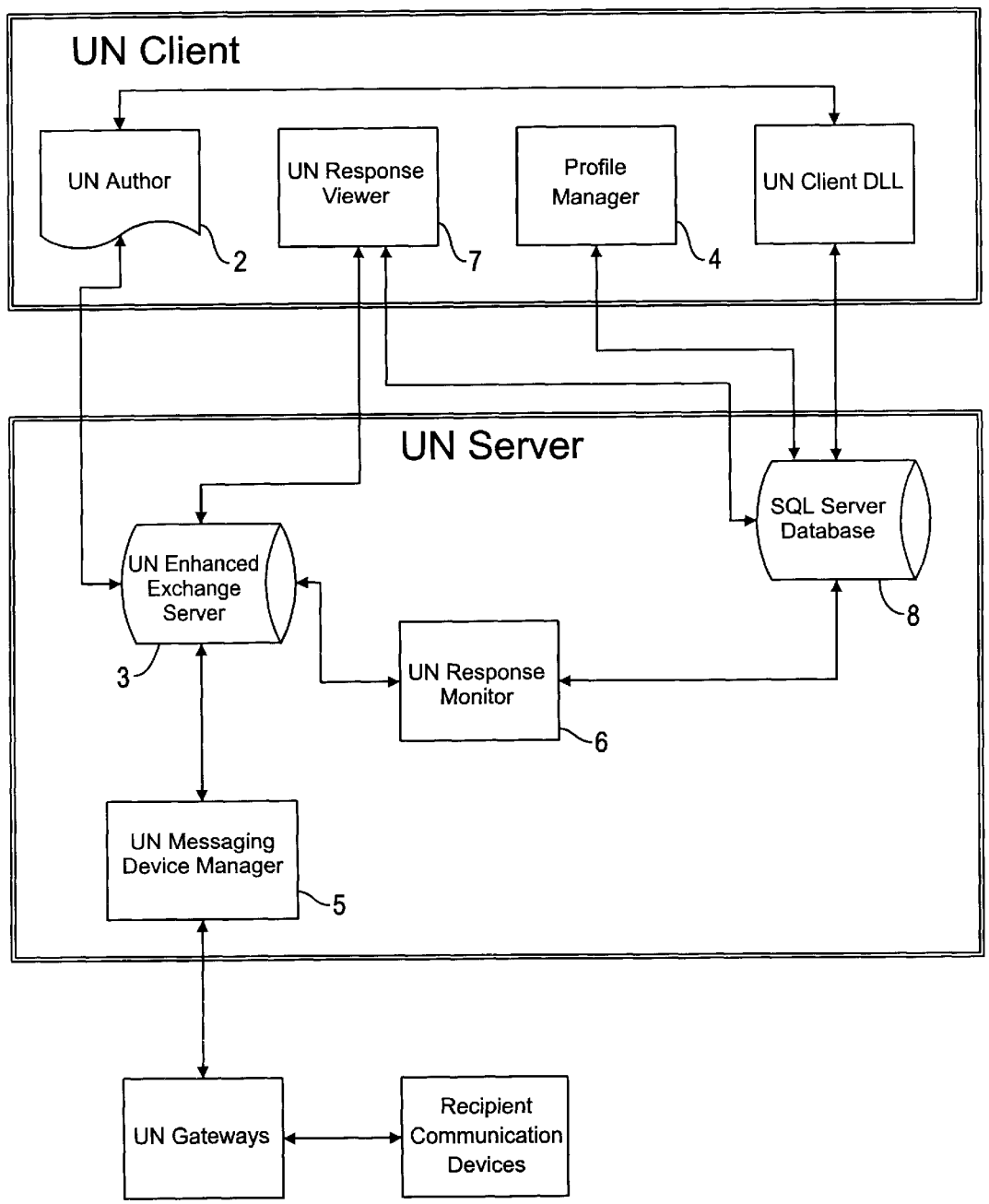
FIG. 9 is a block diagram representation of the system of FIGS. 1–8, as implemented in a Microsoft Windows/Outlook/Exchange Server computing platform.
Figure 10:
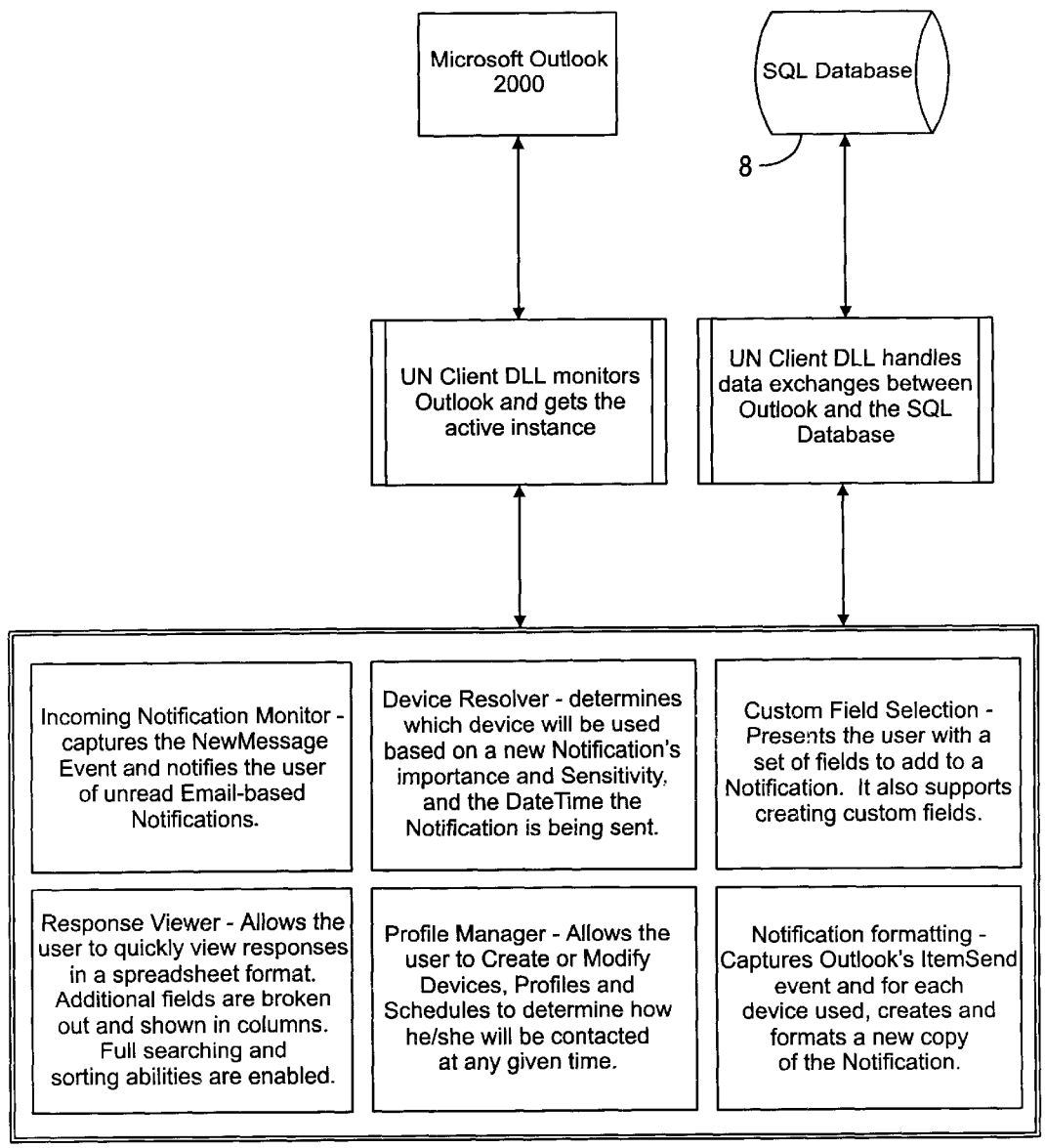
FIG. 10 is a block diagram and flow chart showing the functionality of the UN Client DLL module used in the system of FIG. 9.
Figure 11:
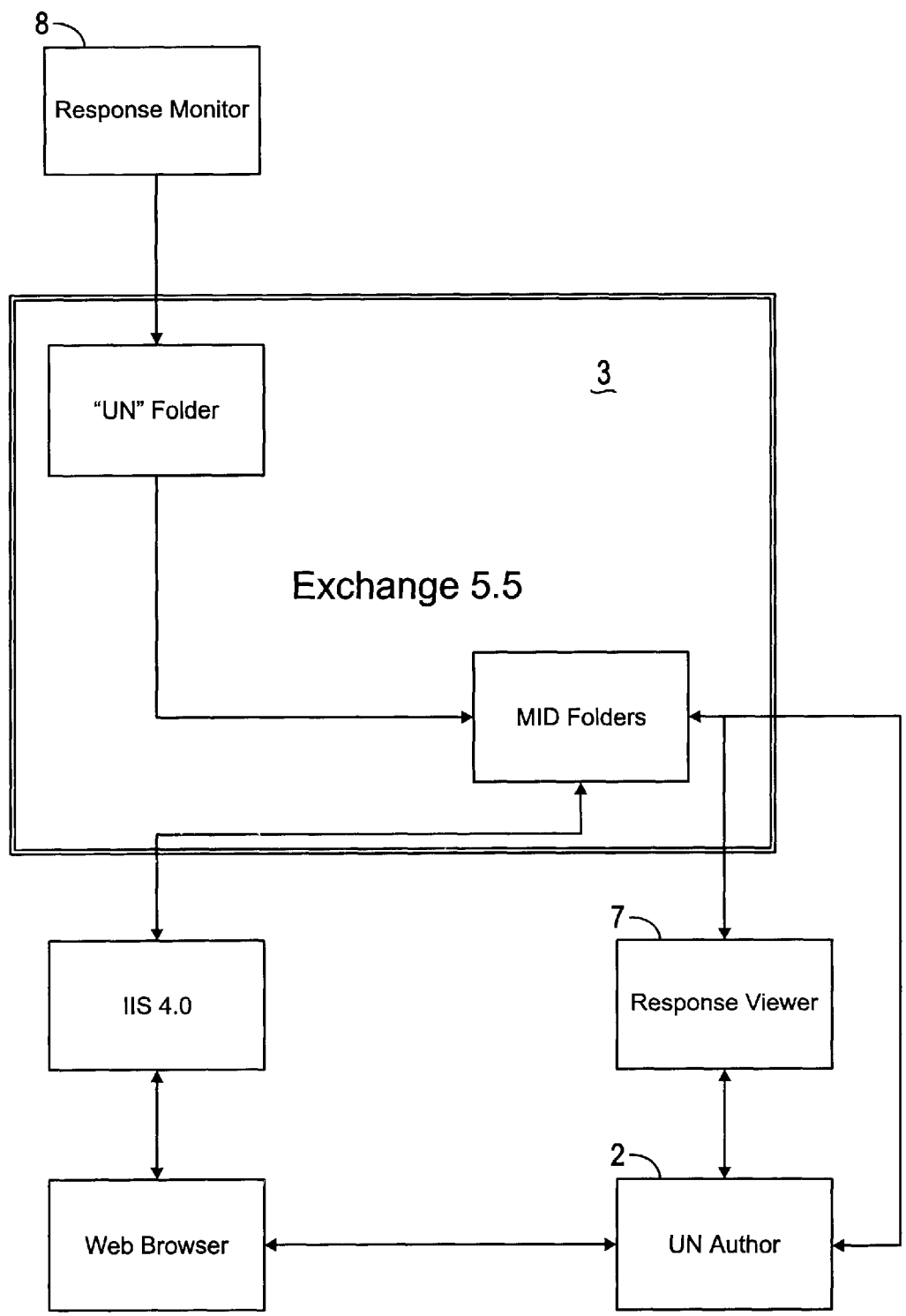
FIG. 11 is a block diagram showing the operative connection of the Server Notification module of FIG. 9 (as implemented in Microsoft Exchange Server) to other system components.
Figure 12:
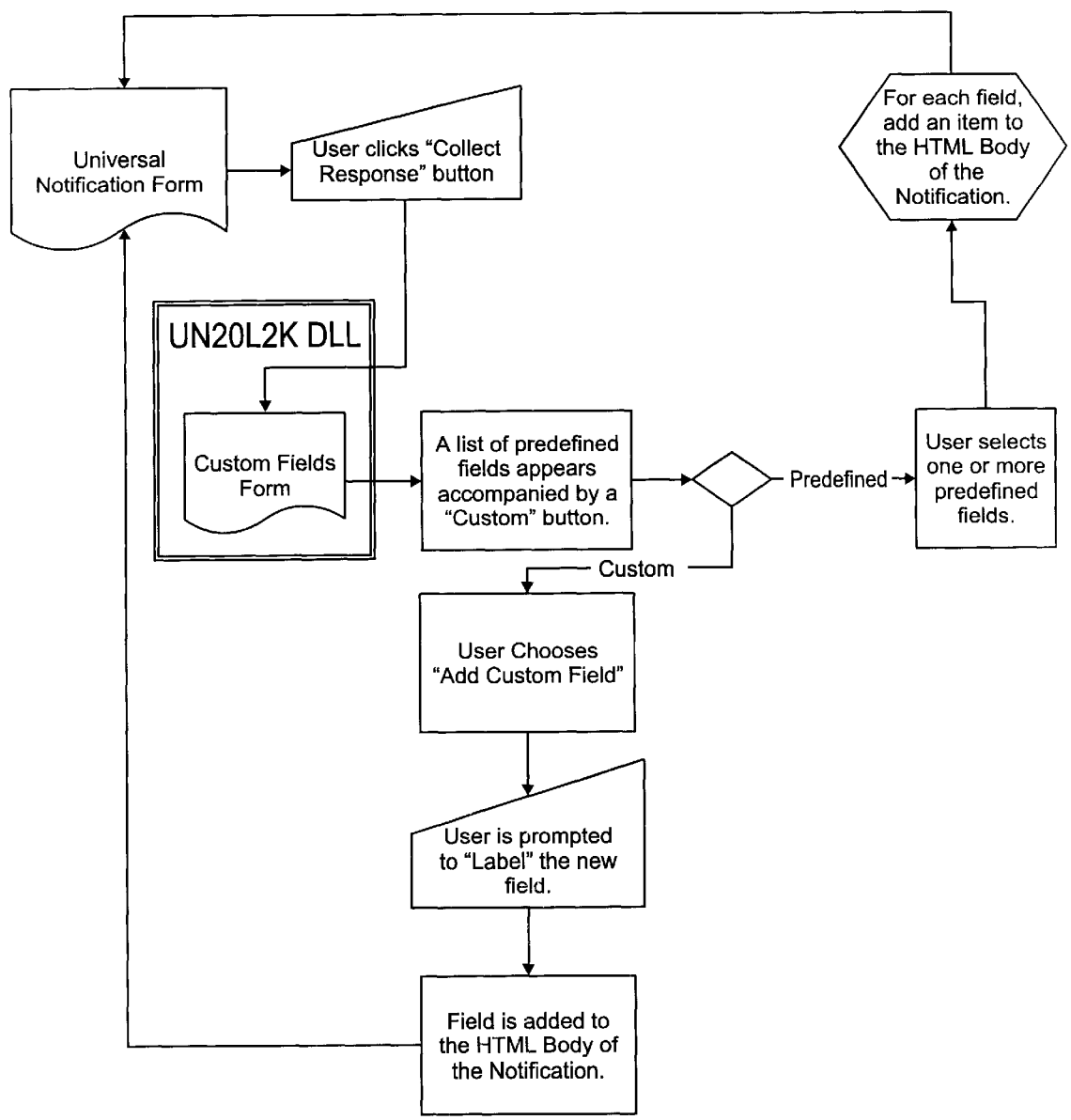
FIG. 12 is a flow chart showing the steps of how a user of the system of FIG. 9 can add fields to a pre-defined system message form.
Figure 13:
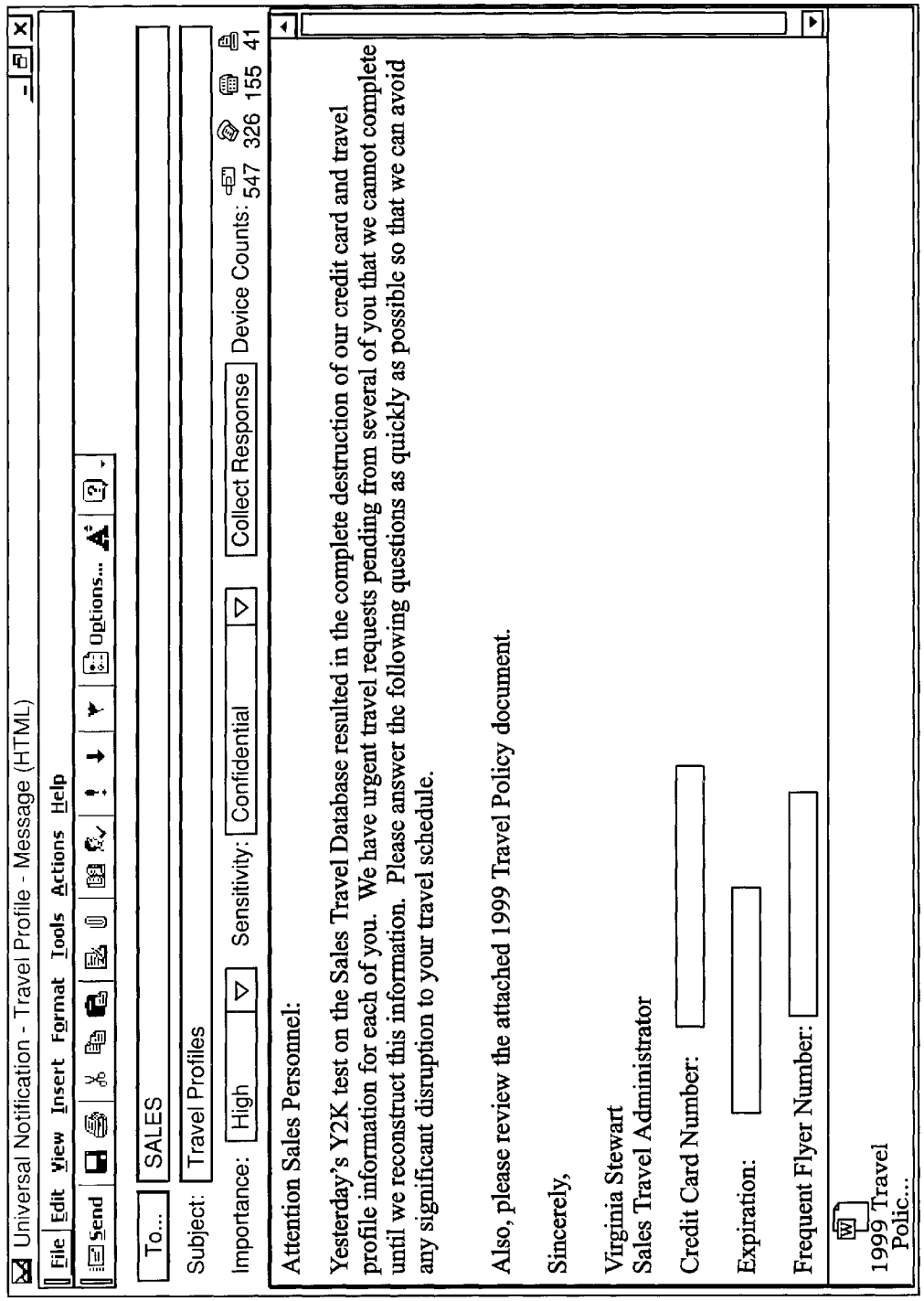
FIG. 13 is a graphic display of a sample universal message form used with the system of FIG. 9, further showing response fields added to the form by the message originator using the Message Author module.

Looking now at FIG. 9, the Message Author 2 is the starting point for implementation of the system 10 in a Microsoft Windows/Outlook/Exchange Server computing environment. The user chooses Message Author 2 with new UN notification on screen to begin the messaging process. The user is presented with a universal message form as shown on FIG. 13. Based upon the user's choice of message sensitivity, importance, and recipients, the user is informed (by icons representing device types and adjacent numerical counts) of the number and type of messaging devices that will be notified. This happens via a UN Client DLL program (FIG. 10) that links to the Outlook program and is part of the installation of the UN Client. After users have seen the information, they can modify their choices until they choose "send". The user can also attach documents and response fields to the message (FIGS. 12 and 13). The UN Client DLL intercepts the send process and some of the processing may continue at this point depending on additional gateway information. The standard system universal message form (FIG. 13) will direct that the responses go to a "UN" Folder (FIG. 11) maintained by Outlook and Server Notification module 3. When working offline (not connected to the Server Notification module 3) the Message Author 2 will not be able to tell what devices will receive the message.

The UN Client DLL (FIG. 10) uses the Outlook 2000 Object model. It will also interact with Microsoft SQL Server, as part of UN Database 8, to obtain the necessary information about a recipient's profile. The UN Client DLL has access to the UN SQL Server Database 8 via a special system login and ID.

Depending on gateway information, the Messaging Device Manager 5 handles e-mail routing and routing to gateways. It also handles the every day chores of address books and other Outlook 2000 features (FIG. 13). The Outlook Global Address list (not shown) is where message recipients will be chosen from and all others will be in the form of standard internet email addresses. Specially named folders residing on Exchange handle forwarding of non-email based messages. The Messaging Device Manager 5 monitors these folders and directs their messages to the appropriate gateway (FIG. 9).

The Messaging Device Manager 5 is a separate module that interacts with gateways. The interface to standard gateways (e.g., pager, phone, and fax) is an e-mail message with a specially formatted address that indicates for which gateway it is destined. However, each gateway requires a slightly different message format. The Messaging Device Manager 5 performs the necessary conversions automatically.

The UN Server in this embodiment also includes an Internet Information Server module IIS 4.0 (FIG. 11) to enable the use of active server pages, Web based access to Outlook, etc. A conventional Internet Web Browser is used to access this information.

Figure 14:
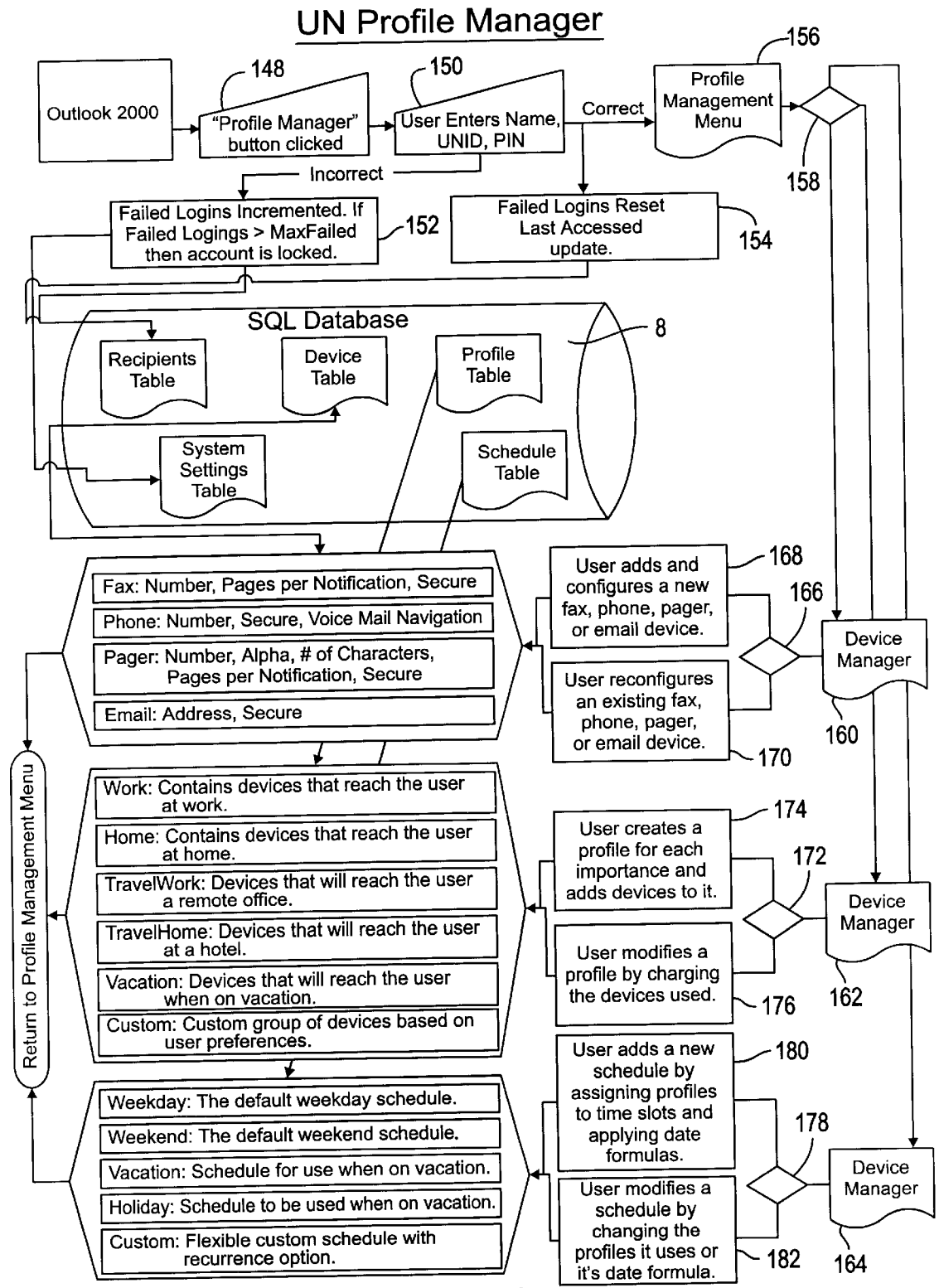
FIG. 14 is a flow chart of the software routines implemented in the Profile Manager of the system of FIG. 9.

The Profile Manager module 4 of this embodiment is shown in FIG. 14. This module allows the recipient to choose which devices he/she will be contacted by and at what times and security levels these devices shall be accessed. The data for this profile will reside on the UN SQL Server database 8. The recipient profiles can be accessed and modified either directly or from the Internet web.

As seen in FIGS. 14, 20, 21, and 22, a recipient sets up his or her recipient profile by making selections from three primary categories: devices, profiles, and schedules. As seen best in FIG. 20, a recipient first selects the "devices" tab and chooses one or more messaging devices that are to be used for delivering messages to that recipient. A check box indicates whether or not that selected device is capable of receiving secure (e.g., encrypted) messages. Information about that device, e.g., a phone number for a work phone, is entered. The recipient then selects the "profile" tab so that profile details corresponding to each selected messaging device can be entered. For example, the recipient will determine whether a particular messaging device is to be used for secure messages or not and which messaging devices will correspond to the three levels of message importance. Finally, the recipient selects the "schedules" tab so that the recipient can assign the various profiles to dates and times. For example, at certain times of the day or on certain days of the week, the recipient may wish to receive messages of normal importance at work only. However, if the message is of high importance, then that recipient may wish to receive the message at home or at work.

Figure 17:
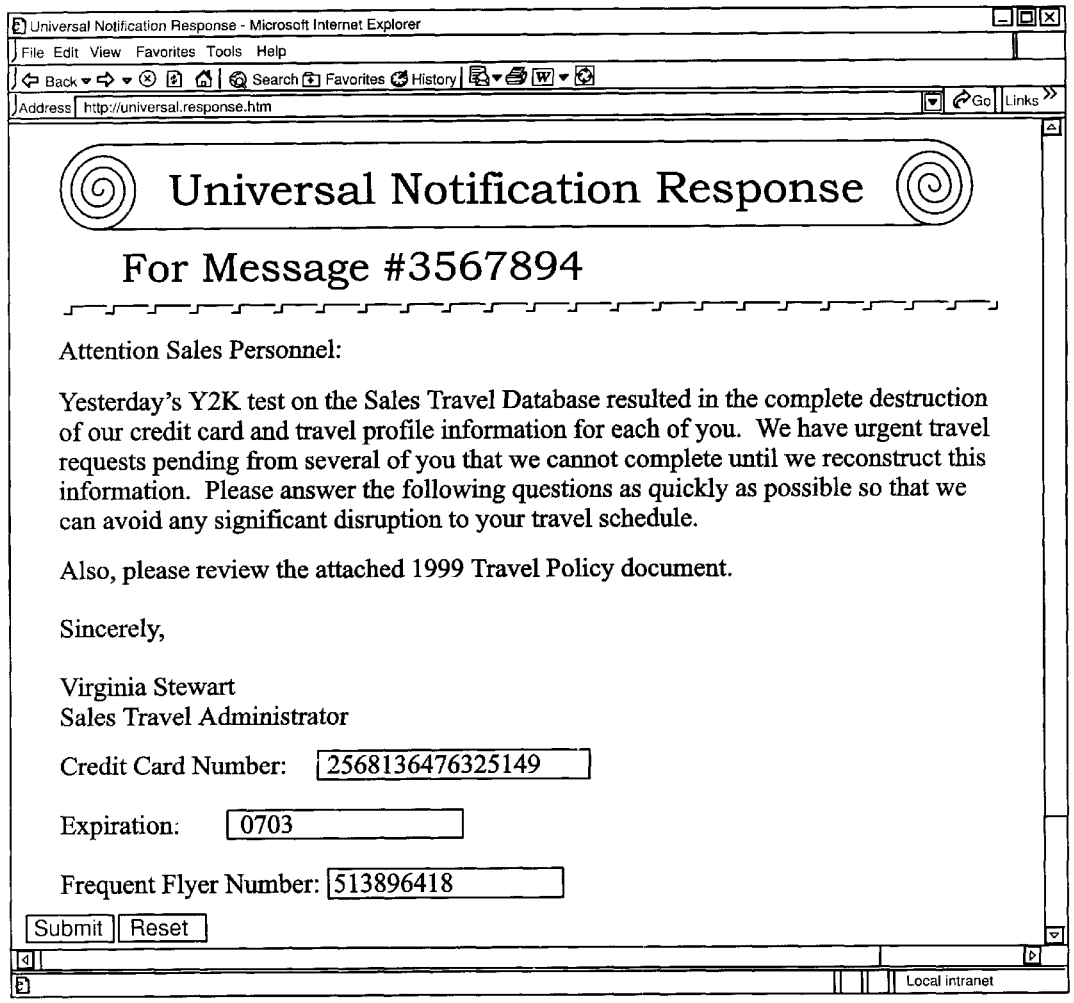
FIG. 17 is a graphic display of a response to the sample message shown in FIG. 13, viewed as an individual e-mail response message using the Response Viewer module, as implemented in the system of FIG. 9.

The recipients may respond to messages by e-mail, by conventional interactive voice response using a telephone and touch-tone keypad, or by entering response information on a response page corresponding to a specific message and automatically posted on the Internet by the system 10. An example of such a response page is shown in FIG. 17.

Figure 15:
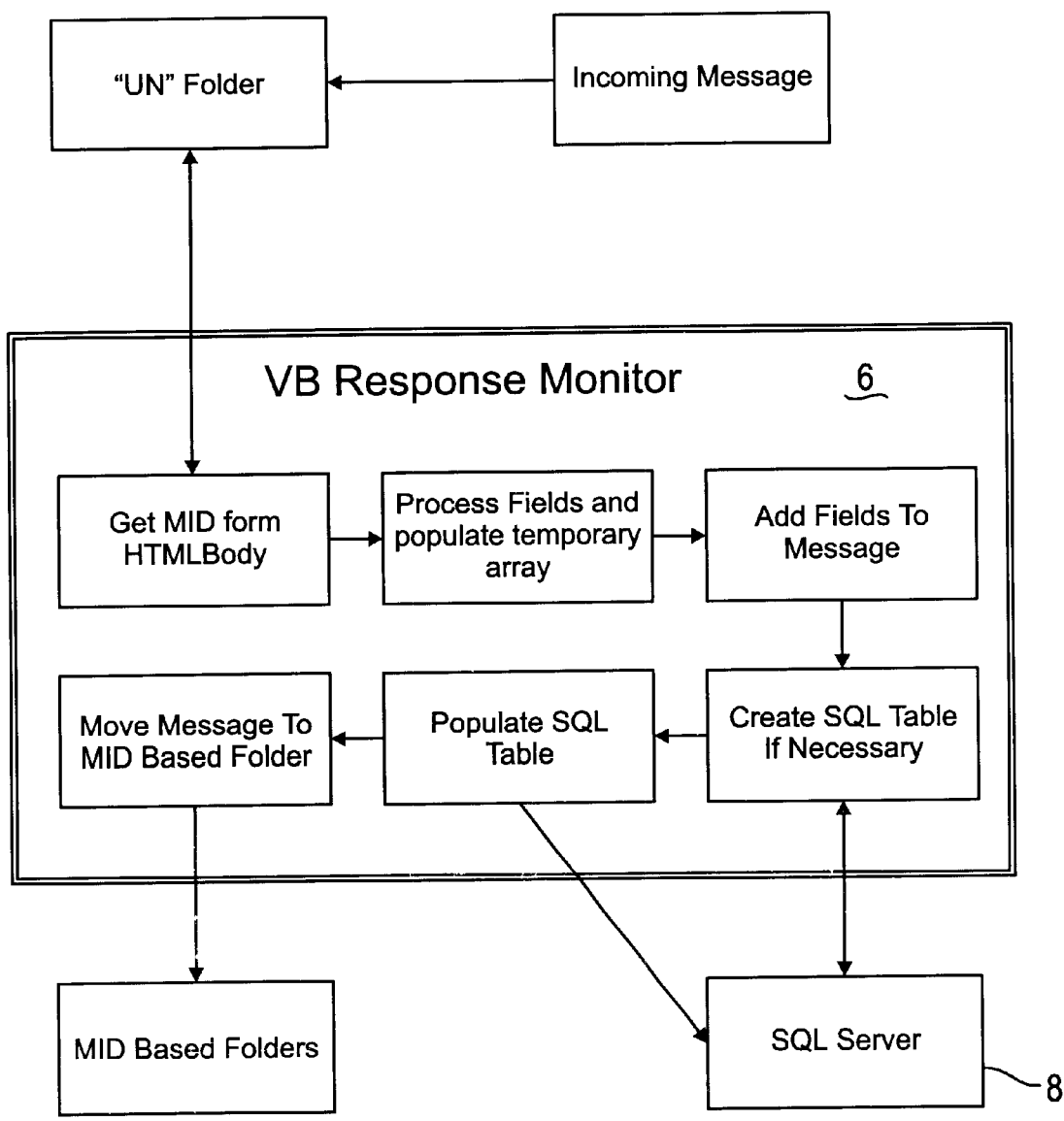
FIG. 15 is a block diagram overview of the flow of message information in the Response Monitor module in the system of FIG. 9.

The Response Monitor 6 (FIG. 15) as used in this embodiment is preferably a Visual Basic 6.0 executable file running on the UN Server. This module also uses the Outlook 2000 object model. This module uses the CDO (Collaboration Data Objects) applications programming interface to monitor the UN Folder (FIGS. 11 and 15) and check for new entries on a periodic basis. It routes the responses from the UN Folder to the specific UN MID based folders based upon a Message ID (MID) number. It also sets permissions on this folder. The UN Folder is a specific folder that resides on Microsoft Exchange Server. The specific UN MID based folders are unique folders for which the message creator corresponding to the MID folder name has access privileges. The originator of the message can maintain and view messages from a MID folder. After a specific amount of time a MID folder will expire. However, prior to expiration, a message is sent to the originator that the MID folder will expire in a short amount of time (i.e. 2 weeks).

The UN SQL Server Database 8 is the repository for profile information. Preferably, the Database 8 will reside on the same computer that supports the UN Server although it could be located in a separate sub-system. The Database 8 is also the repository of information about the fields for a response and setup information.

Figure 16:
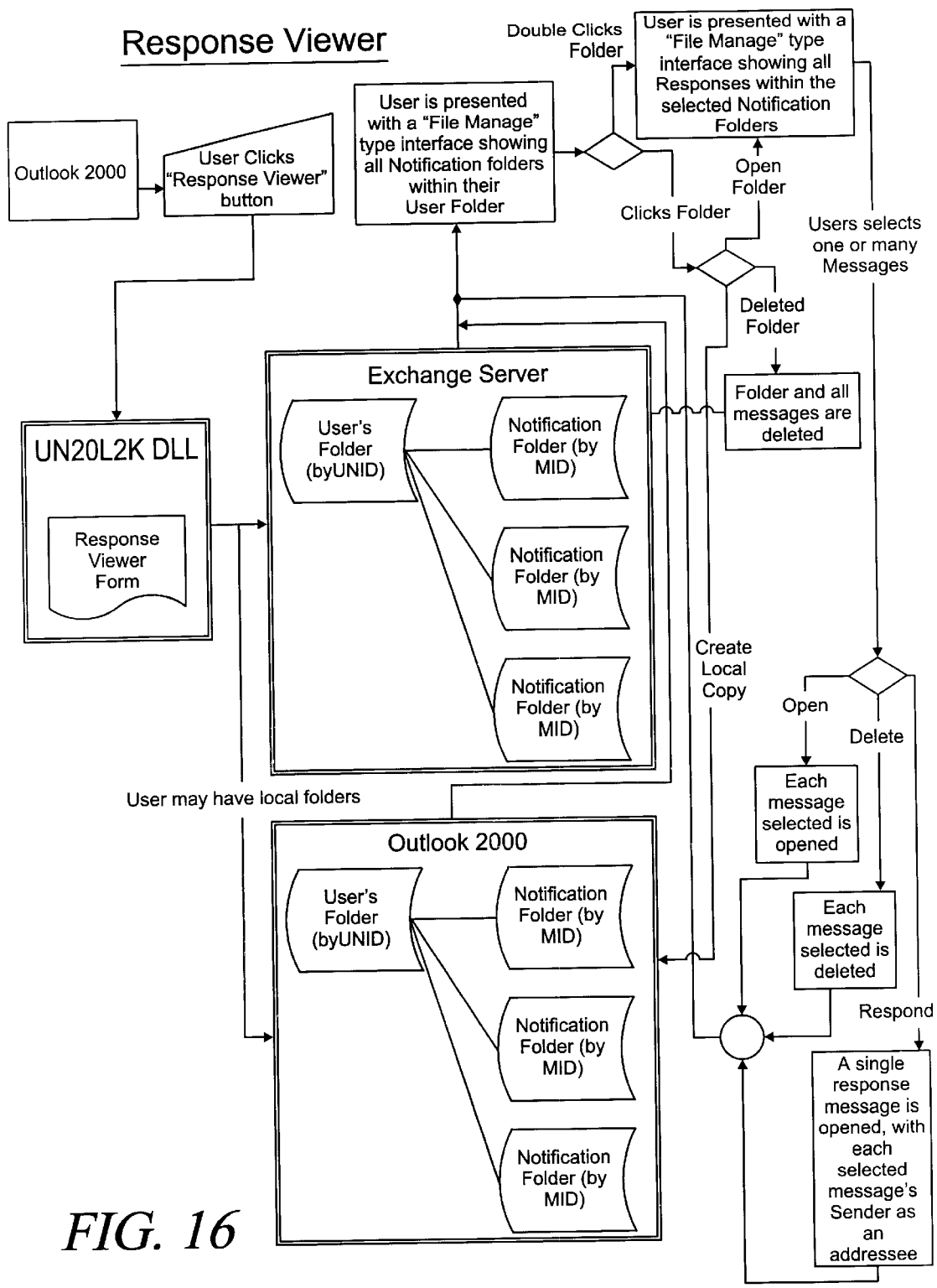
FIG. 16 is a flow chart of the software routines implemented in the Response Viewer module of the system of FIG. 9.
Figure 18:
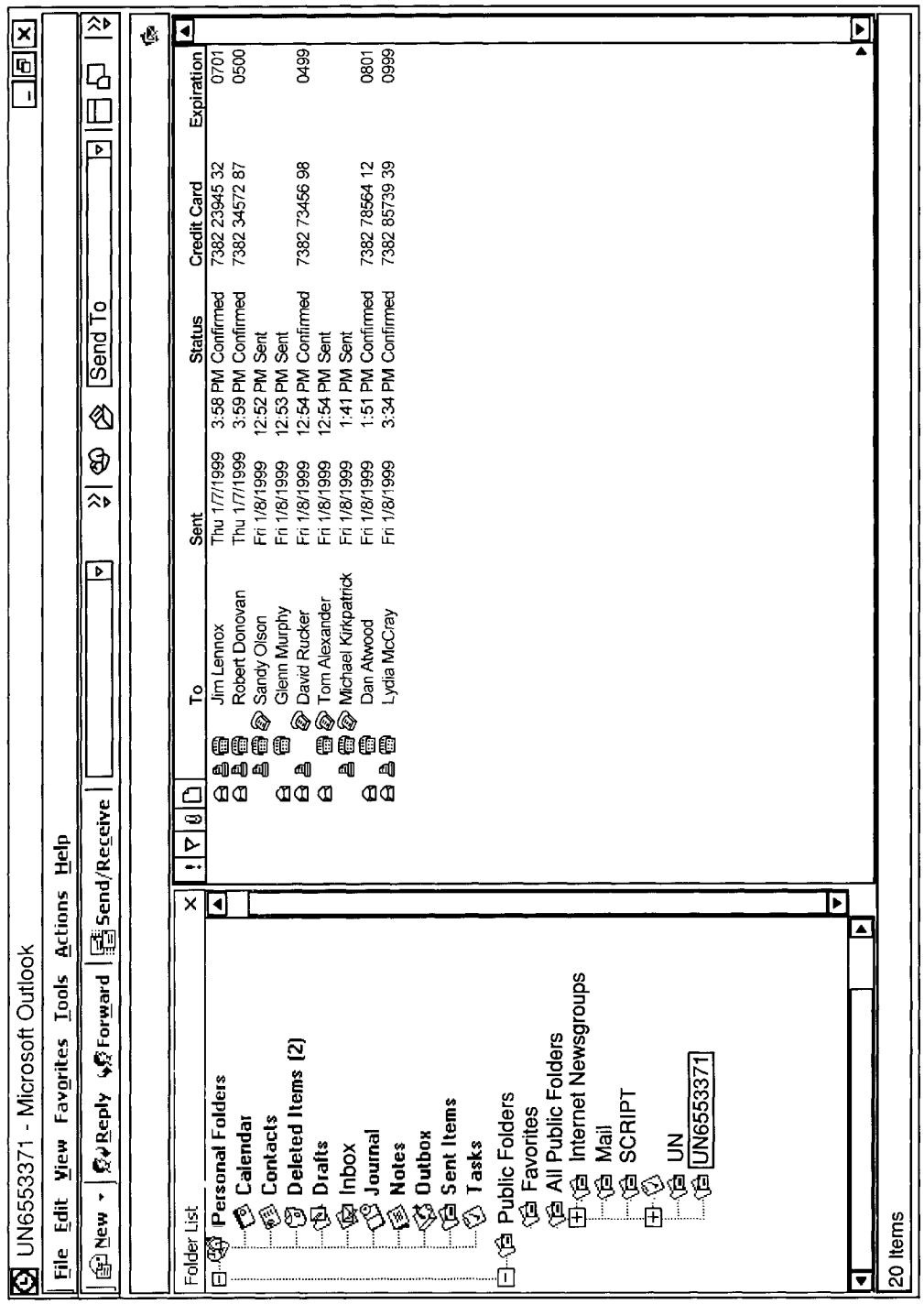
FIG. 18 is a graphic display of a group of organized responses to the sample message shown in FIG. 13, viewed in an Outlook folder view using the Response Viewer module, as implemented in the system of FIG. 9.
Figure 20:
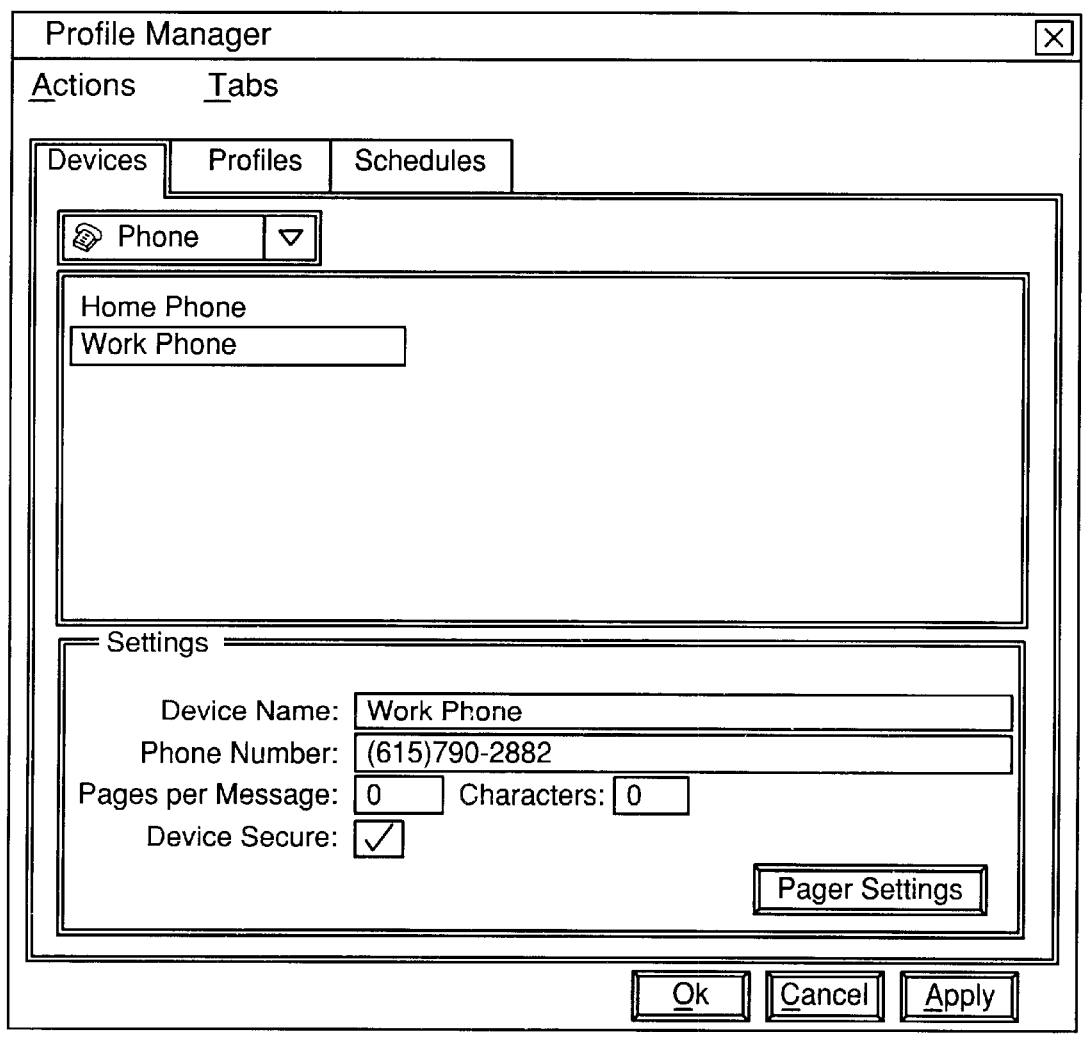
FIG. 20 is a graphic display of the "Devices" tab dialogue box presented to a recipient when using the Profile Manager module as implemented in the system of FIG. 9.
Figure 21:
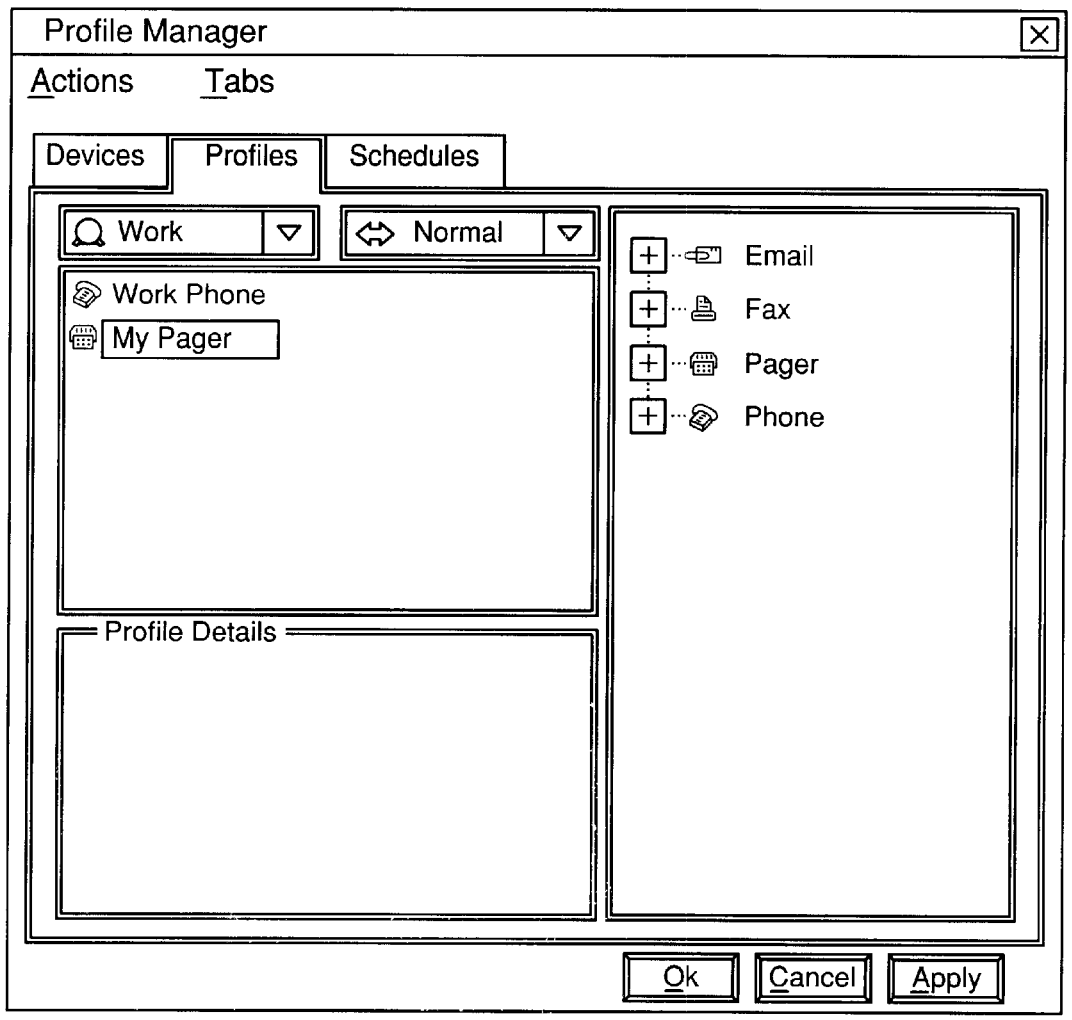
FIG. 21 is a graphic display of the "Profiles" tab dialogue box presented to a recipient when using the Profile Manager module as implemented in the system of FIG. 9.
Figure 22:
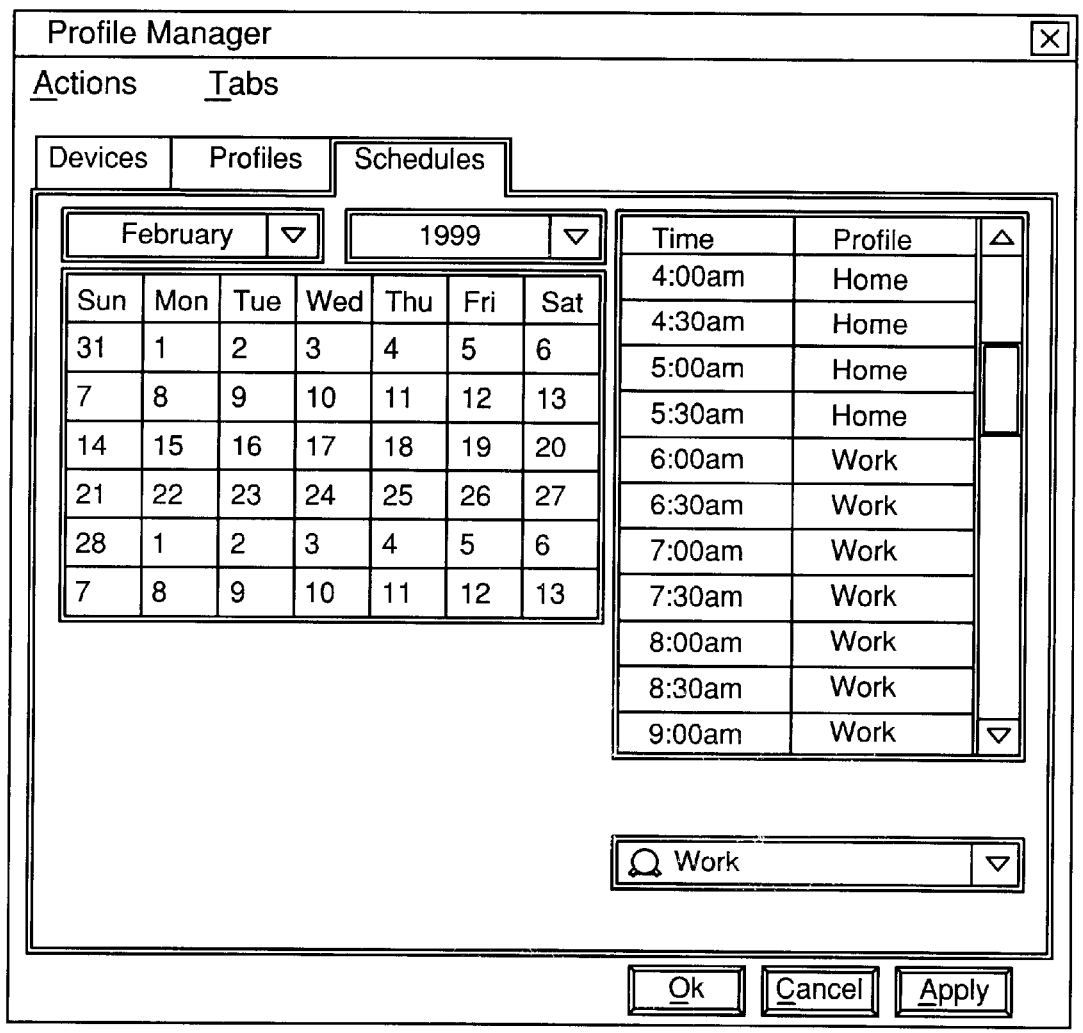
FIG. 22 is a graphic display of the "Profiles" tab dialogue box presented to a recipient when using the Profile Manager module as implemented in the system of FIG. 9.

The Response Viewer 6 of the Microsoft Windows/Outlook/Exchange embodiment is shown in FIG. 16. It allows the user to see information about the responses that have been received. The user can see the messages with the fields as in the normal viewing of Outlook folders, as shown on FIG. 18. In addition, a separate program file that contains the responses in a formatted fashion can be exported to a variety of different programs, such as a Microsoft Excel spreadsheet as shown on FIG. 19. As shown on FIG. 18, the response information organized and displayed can include the identification of the recipients, status and time of message delivery, substance of the response, identification of the messaging device(s) used to deliver the message, time of response, etc.

The UN Database 8 of this embodiment can be organized generally as shown in FIG. 8, using the following table and field definitions:

Tables:

Recipients

UNID - 7 Digit Number
UserName - 255
PIN - 4 Digit Number
TempTable - Boolean
LastAccessed - Date/Time
LastModified - Date/Time
Devices ID - AutoNumber
UNID - From Recipients Table
Name - INT
Number - 255
ModemNumber - 255
Secure - Boolean
LastModified - Date/Time
NumReceived - INT
Length - INT
Resends - INT
Schedule ID - AutoNumber
UNID - From Recipients Table
Type - Weekend, Weekday, Custom
StartDate - Date/Time
EndDate - Date/Time
Times every 30 minutes from 12 a.m. to 11:30 p.m.
Format T0000 to T2330
DeviceCollection ID - AutoNumber
UNID - From Recipients Table
WORK - String of Ids
HOME - String of Ids
TRAVELWORK - String of Ids
TRAVELHOME - String df Ids
OTHER - String of Ids
Priority - O,1,2
Response Tables - Table name based on the Message ID ID - Autonumber
UNID - Recipients ID Number
TimeReceived - This is the time that the message was received
ResponseText - The text response
Body - Whole message body
NumFields - The number of user defined fields
Field Names based on UN Sender's field choices When implemented as shown above, selecting "UN" in Outlook 2000 starts the loop with messaging and notification modes. Messages can be sent in low, normal or high importance modes. The UN Client makes faxing, paging and voice communications from e-mail easy to use by shielding the user from the details of each recipient's devices and work schedule. As seen on FIG. 13, the user is presented with a standard universal message form. He/she then selects recipients from the global address list, adds fields if desired, fills out the message form, and sends the message. The message form displays the quantity and type of devices to receive messages, as obtained from the various collective recipient profiles. Ad hoc additions to the global address list and associated messaging device information are available for real-time profile additions by the user. Once the message is sent, the UN Server provides text-to-speech conversion and voice mail navigation for phone and voice mail recipients, and manages message notification for all messaging devices indicated in conjunction with Microsoft Exchange Server.

The UN Client can also provide a "response field" option (FIG. 12) for defining additional information he/she may require from the recipient for report generation or other business processes. The UN Client user merely chooses the fields of information applicable and drops them in the message (see FIG. 13) for presentation to the recipient. Results are tabulated for review in the Response Monitor 6, as shown on FIGS. 18 and 19.

Once messages are sent, the Response Monitor 6 closes the loop with immediate verification of receipt and responses. The user selects UN in Outlook 2000 personal folders (FIG. 13), clicks on the specific message for monitoring, and response information and details for each message are presented. All messaging devices used for contact are indicated for each recipient as well as time of status confirmation. If the Response Field feature was used, then captured information is also presented to the user in a pre-defined format for processing.

The Profile Manager 4 in Outlook 2000 provides quick and easy recipient profile set up, test and maintenance. The recipient uses system extensions in the global address list to enter personal scheduling information, message priority, and all messaging devices he wishes to be contacted through, including an associated security level. This allows the recipient to manage communications tools that he chooses according to priority level and personal schedules that he sets up. Updates to devices, schedules and profiles can be made at any time either in Outlook 2000 or from a corporate Web page. During development of the profile, all devices may be tested for integration verification.

Receipt of a system message is formatted for specific devices (i.e. e-mail, pager, fax, phone) defined in a recipient's profile. Text-to-speech is provided for phone receipt, and voice mail navigation is accomplished through the UN Server software. Any recipients of system messages that are not profiled will receive e-mail by default, with a reminder to set up their profile to take full advantage of the communications, scheduling and priority extensions to enhance their business productivity. A recipient may respond to the system message through the most convenient device available to him at the time and is prompted to supply information requested by the sender for proactive closure. The recipient's response back to the sender can be initiated by e-mail; phone or Web activated devices.

Licensed UN Client users are registered through a UN Administration Console (not shown). UN Clients can be added and deleted up to the license limitations using e-mail address identifications. UN Client licenses can be purchased for additional users. Only senders must be licensed, as recipients can establish profiles and respond without a UN Client software license. All global address list entries are initially notified of the UN Profile Manager opportunity from the Administration Console, where both registered Client users and recipient profiles are managed.

The Administration Console also manages messaging priority limitations for all registered Client users. Client users can set low/normal/high priority limitations in their profiles for any and all other registered Client users, or the system manager may set limitations in accordance with corporate policies.

The Administration Console provides management of system defaults, Web page profile and response configurations, and activity reports such as traffic, transmission and errors. The system manager can look at system usage, peak loads, device driver utilization, task identifications and other functions to determine when and where maintenance or software and hardware expansions are required. Database 8 mining is accomplished from the Administration Console as well.

As described above, automatic triggers in the form of a pre-formatted external e-mail message (triggered by an external event) can be sent to a message trigger mailbox on the system 10 to initiate system messages.

UN Client and UN Server modules are initially installed using the Microsoft Windows Installer Service. This is a quick and easy process administered by the system manager. The Administration Console is then accessible from the System Manager's designated desktop. The UN Server resides on a LAN in conjunction with the Server Notification Module 3 (Exchange 5.5, for example) and UN Database 8 (Microsoft SQL 6.5, for example). UN Client software may be downloaded to licensed users who also have a copy of Outlook 2000.

The 3-tier architecture of this embodiment of the system is fully scalable from small office to enterprise environments. The UN Client is integrated with Outlook 2000 for full compatibility with Office 2000 users. For medium and large customers where traffic and channel density increases, the UN Client and UN Server exploit Microsoft NT multi-threaded architecture, SQL server and Exchange server. Exchange and SQL servers provide communications and database standards for full CTI compatibility. Supported standards include; MAPI, TAPI, X.400, AMIS, TAP, and PET.

The routines and steps described above are easily implemented using standard programming tools, libraries and techniques, such as Visual Basic and Microsoft Windows Speech Applications Programming Interface (SAPI). A number of conventional messaging device servers and interfaces can be used with the system, including: Fax SR from OmTool, Harmony from OpenPort Technologies, or Right-Fax from Applied VoiceTechnology for fax services; and Mobile Connector from Fenestrae, or TAP interface (alternatively known as PET or IXO) as defined by Personal Communications Industry Association for pager services. Interactive voice server technology, including a voice server, text to speech library, and voice mail navigation system is available from Dialogic Communications Corporation, Franklin, Tenn.

Thus, although there have been described particular embodiments of the present invention of a new and useful Automated System and Method for Delivery of Messages and Processing of Message Responses, it is not intended that such references be construed as limitations upon the scope of this invention except as set forth in the following claims.

What is claimed is:

1. A system for sending messages to messaging devices used by recipients and for processing message responses from the recipients comprising:

a. a message client comprising a message authoring module to allow a user to generate message content and message information using a universal message form, the message authoring module including means to embed a response field in the message form so that message recipients can add message responses to the form;

b. the message client further including a recipient profile module, to allow each recipient to create a recipient profile corresponding to that recipient, the recipient profiles including profile data selected by each recipient that define message delivery devices and message delivery methods for messages directed to that recipient, according to messaging rules created by the recipients that include message priority, messaging device security, and time;

c. a message server operatively connected to the message client for receiving the message information from the message authoring module and including a translator for automatically converting the message form and message content into one or more message formats usable by the messaging devices selected by the recipients in their corresponding recipient profiles;

d. the message server further including a messaging device manager for automatically routing the messages to at least one of the messaging devices selected by the recipients in their recipient profiles in accordance with the messaging rules created by each recipient and a response monitor module for receiving and automatically processing the message responses from the recipients into message response information;

e. a system database for storing the recipient profiles, messages, and message response information, the message response information including identification of the recipients, status of message delivery, substance of responses to questions imbedded in the response field imbedded in the message form, identification of the messaging device(s) used to deliver the message, and time of response; and f. a response viewer module for allowing the user to view the message response information, including a compilation of the message responses added to the response fields in the message form by the recipients.

2. The system of claim 1 wherein the messaging devices comprise pagers.

3. The system of claim 1 wherein the messaging devices comprise fax machines.

4. The system of claim 1 wherein the messaging devices comprise e-mail readers.

5. The system of claim 1 wherein the messaging devices comprise telephones.

6. The system of claim 1 wherein the messaging devices comprise personal computers.

7. The system of claim 1 wherein the messaging devices comprise voice mail boxes.

8. The system of claim 1 wherein the messaging devices are of different types selected from a group comprising pagers, fax machines, e-mail readers, telephones, personal computers, and voice mailboxes.

9. The system of claim 1 wherein the translator and messaging device manager are adapted for translating the message form and content of a single message intended for a single recipient into a plurality of message formats for transmitting the single message to messaging devices of different types when more than one messaging device has been selected by the recipient in the recipient's corresponding recipient profile.

10. The system of claim 9 wherein the message client and message server are operative to generate a single message for delivery to multiple recipients using the universal message form to create the message and the translator and messaging device manager are further operative to translate the message content of the single message into a plurality of message formats for transmitting the single message to messaging devices of different types when more than one messaging device has been selected by one or more of the multiple recipients in the recipients' corresponding recipient profiles.

11. The system of claim 10 wherein the message author is operative to display the types and number of messaging devices to which the single message will be sent, in accordance with the recipient profiles.

12. The system of claim 11 wherein the message authoring module is operative to attach files to the message.

13. The system of claim 1 wherein the recipient profile manager is operative to allow the recipients to modify their corresponding recipient profiles by accessing the message client.

14. The system of claim 13 wherein the recipients can modify their corresponding recipient profiles by assigning selected message delivery priorities to one or more of the selected messaging devices, and by assigning one or more of the selected message delivery priorities and selected messaging devices to one or more of the schedules.

15. The system of claim 14 wherein the recipients can modify their respective recipient profiles by accessing an Internet web page.

16. The system of claim 1 wherein the message server is operative, in response to a formatted e-mail message sent to the system from an external source, the external message specifying the message content and one or more recipients, to automatically generate the message form, content and message information, and to deliver the message to the specified recipients and messaging devices in accordance with the recipient profiles corresponding to the recipients specified in the external message.

17. The system of claim 16 wherein the formatted e-mail message includes a message priority and message sensitivity that is used by the system to determine which messaging devices are used to deliver the message to the recipients in accordance with the recipient profiles.

18. The system of claim 17 wherein the messaging device manager is operative to receive a message response from a recipient using a messaging device that is different from the messaging device to which the corresponding message was received by the recipient.

19. The system of claim 18 wherein the recipients can respond to a specific message by entering the response information on an Internet web page automatically generated by the system and linked to the specific message.

20. The system of claim 17 wherein the response monitor module, response viewer, and system database are operative to organize and visually summarize all of the message response information received by the system in response to each single message.

21. A method of allowing a user to send a message to a recipient using at least one messaging device comprising the steps of:

a. creating message content and message information for the message on a universal message form at a message client, the message information including identification of the recipient for the message;

b. automatically accessing a recipient profile stored in a database, the recipient profile created by the recipient and containing information identifying a type of messaging device selected by the recipient for receiving the message, in accordance with messaging rules created by the recipient, the messaging rules taking into account message priority, the recipient's schedule, and device security;

c. translating in a message server the message form and content into a message format usable by the type of messaging device selected by the recipient in the recipient profile;

d. transmitting the message to a messaging device manager adapted to communicate with the messaging device selected by the recipient in accordance with the messaging rules created by the recipient;

e. receiving in the message server a response to the message sent by the recipient using one of the types of messaging devices;

f. automatically linking the response to the message to the message information created on the message client; and g. viewing the message response on the message client, h. identifying multiple recipients for the message in the message information;
i. accessing multiple recipient profiles in the database corresponding to the multiple recipients identified in the message information;
j. transmitting the message to the messaging device manager adapted to communicate with each messaging device selected by the recipients;
k. receiving in the message server a response to the message sent by each of the recipients using the messaging devices;
l. automatically linking each of the responses to the message to the message information created on the message client;
m. storing the message responses and message response information on the database the message response information identification of the recipients, status of message delivery, substance of responses to questions imbedded in the response field imbedded in the meassge form, identification of the messaging device(s) used to deliver the message, and time of response; and
n. organizing the message responses for viewing on the message client.

22. The method of claim 21 wherein the messaging device types include pagers, e-mail readers, telephones, personal computers, fax machines and voice mail systems.

23. The method of claim 22 wherein the type of messaging device used by the recipients to send a message response is different from the type of messaging device used to deliver the message to the recipients.

* * * * *